US012613056B2

(12) United States Patent
Burfitt

(10) Patent No.: US 12,613,056 B2
(45) Date of Patent: *Apr. 28, 2026

(54) MODULAR SOLAR ENERGY HARVESTING AND STORAGE SYSTEMS FOR POWER GENERATION

(71) Applicant: Sol Energia Inc., Tullahoma, TN (US)

(72) Inventor: Jon Wade Burfitt, Tullahoma, TN (US)

(73) Assignee: PHOTONSTOR CORP., Tullahoma, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/002,607

(22) Filed: Dec. 26, 2024

(65) Prior Publication Data

US 2025/0137691 A1 May 1, 2025

Related U.S. Application Data

(63) Continuation-in-part of application No. 18/753,599, filed on Jun. 25, 2024, now Pat. No. 12,222,137.

(Continued)

(51) Int. Cl.
*F24S 20/70* (2018.01)
*B63B 35/44* (2006.01)
(Continued)

(52) U.S. Cl.
CPC .............. *F24S 20/70* (2018.05); *B63B 35/44* (2013.01); *F24S 20/20* (2018.05); *F24S 23/12* (2018.05);
(Continued)

(58) Field of Classification Search
CPC .. F24S 20/70; F24S 50/80; F24S 20/20; F24S 3/12; F24S 60/00; F24S 50/20;
(Continued)

(56) References Cited

U.S. PATENT DOCUMENTS 4,275,950 A 6/1981 Meyer
4,373,514 A 2/1983 Lois
(Continued)

FOREIGN PATENT DOCUMENTS

CN 2699191 Y 5/2005
CN 114941909 A 8/2022
(Continued)

OTHER PUBLICATIONS

Energy Storage Grand Challenge Roadmap, U.S. Department of Energy, U.S. DOE/PA-0022, Dec. 2020, 157 pages.
(Continued)

*Primary Examiner* — Robert L Deberadinis
(74) *Attorney, Agent, or Firm* — Paradice & Li LLP; Anand S. Chellappa

(57) ABSTRACT

Offshore solar energy harvesting and storage systems for onshore power generation. Solar energy harvesting and storage systems to enhance power generation per acre on land. Thermal energy storage systems and methods that include near-black body concentrated sunlight receivers disposed in thermal storage media for storing sunlight and extracting thermal energy for multiple end-use applications. The thermal energy storage systems are modular and transportable and can be scaled-up in capacity.

40 Claims, 18 Drawing Sheets

Related U.S. Application Data

(60) Provisional application No. 63/661,153, filed on Jun. 18, 2024, provisional application No. 63/523,267, filed on Jun. 26, 2023.

(51) Int. Cl.

| | | |
|---|---|---|
| *F24S 20/20* | (2018.01) |
| *F24S 23/00* | (2018.01) |
| *F24S 50/80* | (2018.01) |
| *F24S 60/00* | (2018.01) |
| *F24S 30/45* | (2018.01) |
| *F24S 50/20* | (2018.01) |
| *G02B 1/06* | (2006.01) |

(52) U.S. Cl.
CPC .............. *F24S 50/80* (2018.05); *F24S 60/00* (2018.05); *B63B 2035/4453* (2013.01); *F24S 30/45* (2018.05); *F24S 50/20* (2018.05); *G02B 1/06* (2013.01)

(58) Field of Classification Search
CPC .. F24S 30/45; B63B 35/44; B63B 2035/4453; G02B 1/06
See application file for complete search history.

(56) References Cited

U.S. PATENT DOCUMENTS

| | | | |
|---|---|---|---|
| 4,408,595 | A | 10/1983 | Broyles et al. |
| 5,195,503 | A | 3/1993 | Ludlow |
| 6,415,783 | B1 | 7/2002 | Harrison |
| 6,742,325 | B2 | 6/2004 | Kudija, Jr. et al. |
| 8,410,621 | B2 | 4/2013 | Chae |
| 8,430,093 | B1 | 4/2013 | Harris |
| 8,752,379 | B2 | 6/2014 | Falcey |
| 9,476,612 | B2 | 10/2016 | Cwik et al. |
| 10,203,134 | B2 | 2/2019 | Johnson et al. |
| 10,393,407 | B1 | 8/2019 | Towe |
| 11,022,102 | B2 | 6/2021 | Rilby |
| 2008/0184990 | A1 | 8/2008 | Tuchelt |
| 2010/0218808 | A1 | 9/2010 | Penciu |
| 2011/0283995 | A1 | 11/2011 | Kesseli et al. |
| 2011/0308762 | A1 | 12/2011 | Spero et al. |
| 2013/0104979 | A1 | 5/2013 | Huang |
| 2013/0139808 | A1 | 6/2013 | Lin et al. |
| 2013/0219890 | A1 | 8/2013 | Majima et al. |
| 2014/0202522 | A1 | 7/2014 | Nunez et al. |
| 2015/0107582 | A1 | 4/2015 | Jin et al. |
| 2016/0102890 | A1 | 4/2016 | Saucedo |
| 2017/0115473 | A1 | 4/2017 | Kozodoy et al. |
| 2020/0049134 | A1 | 2/2020 | Riyait |
| 2020/0295704 | A1 | 9/2020 | Towe |
| 2021/0381724 | A1 | 12/2021 | Miller |

FOREIGN PATENT DOCUMENTS

| | | |
|---|---|---|
| CN | 115183310 A | 10/2022 |
| JP | H0727425 A | 1/1995 |
| JP | 6440267 B2 | 12/2018 |
| KR | 101583295 B1 | 1/2016 |

OTHER PUBLICATIONS

Xu, X. et al., "Prospects and problems of concentrating solar power technologies for power generation in the desert regions," Renewable and Sustainable Energy Reviews, vol. 53 (2016), pp. 1106-1131.

Ma, Z. et al., "Near-Blackbody Enclosed Particle-Receiver Development", National Renewable Energy Laboratory, Technical Report NREL/TP-5500-67997, Dec. 2015, 57 pages.

Invitation to Pay Additional Fees issued in International Application No. PCT/US2024/035449, dated Oct. 31, 2024; 14 pages.

International Search Report and Written Opinion issued in International Application No. PCT/US2024/035449, dated Feb. 3, 2025; 29 pages.

100

| | PTC | SPT | LFR | PDS |
|---|---|---|---|---|
| Capacity range (MW) | 10-250 | 10-100 | 5-250 | 0.01-1 |
| Operating temperature range (°C) | 150-400 | 300-1200 | 150-400 | 300-1500 |
| Solar concentration ratio | 50-90 | 600-1000 | 35-170 | < 3000 |
| Solar to electricity efficiency (%) | 10-16 | 10-22 | 8-12 | 16-29 |
| Relative cost | Low | High | Low | Very high |
| Power cycle | Steam Rankine; Organic Rankine | Steam Rankine; Brayton cycle (gas turbine) | Steam Rankine; Organic Rankine | Stirling Engine; Steam Rankine; Brayton cycle (gas turbine) |
| Commercial maturity | High | Medium | Medium | Low |
| Outlook for improvements | limited | Very significant | significant | High potential through mass production |
| Advantages | Long term proved reliability and durability; Modular components; Compatible with combined cycles burning oil or gas; | High efficiency; Compatible with Brayton cycle and combined cycles burning oil or gas; Modular components; | Simple structure and easy construction; Modular units; Compatible with combined cycles burning oil or gas; | High efficiency; Modular units; No need for water cooling |
| Disadvantages | Relatively low efficiency; Limited operational temperature; Complex structure; Need water for cooling and cleaning | High maintenance and equipment costs; Need water for cooling and cleaning | Relatively low efficiency; limited operational temperature | Low commercial maturity; No thermal storage available |

Optical
Window 207

Light duct
206

First chamber
201

205
Insulation
region

204
Second
chamber

202
Concentrated
sunlight
receiver

293
Supports

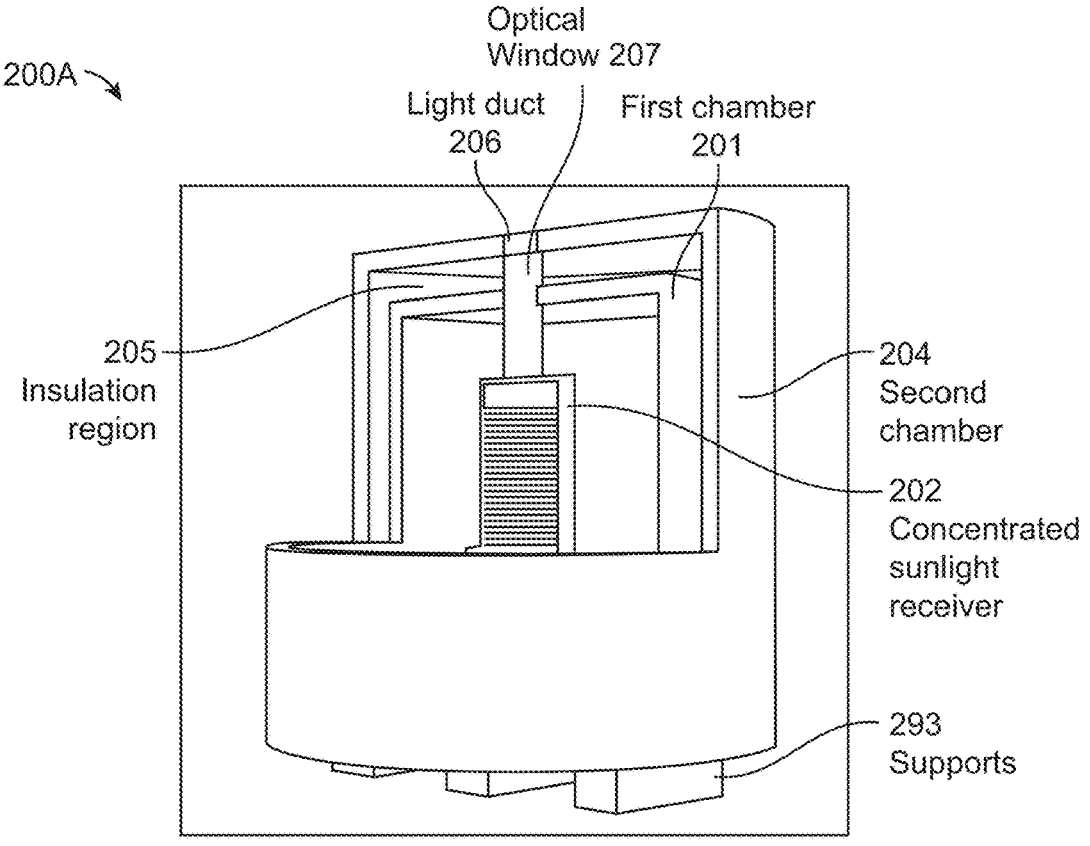

209
Light duct inlet

Light duct
206

201
First chamber

205
Insulation
assembly

208
Light
dispersing element

210
Concentrated sunlight
receiver inlet

202
Concentrated
sunlight receiver

203
Thermal storage
media

204
Second
chamber

293
Supports

250
Dispersing element
surface

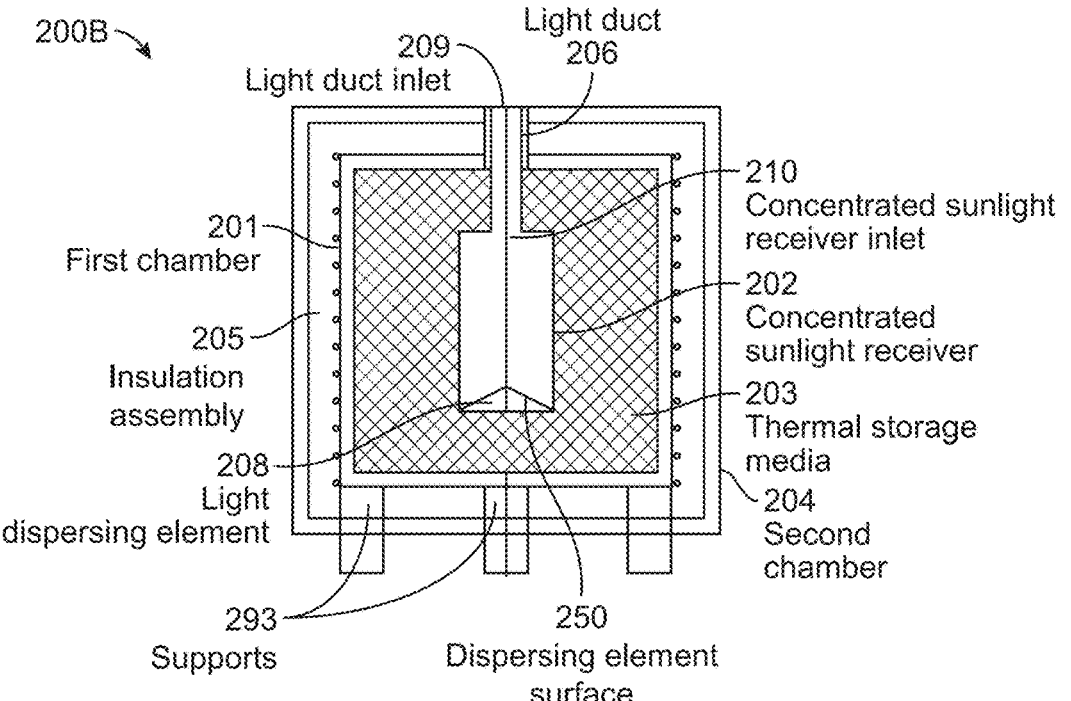

315D
Receiver
wall

324
Receiver wall inner surface
square/trapezodial -shaped
grooves
(not to scale)

$N_1$ $N_2$ d

300C

315C
Receiver
wall

323
Receiver wall inner
surface V-shaped
grooves
(not to scale)

300B

315B
Receiver
wall

312B
Receiver wall inner
surface roughness
(not to scale)

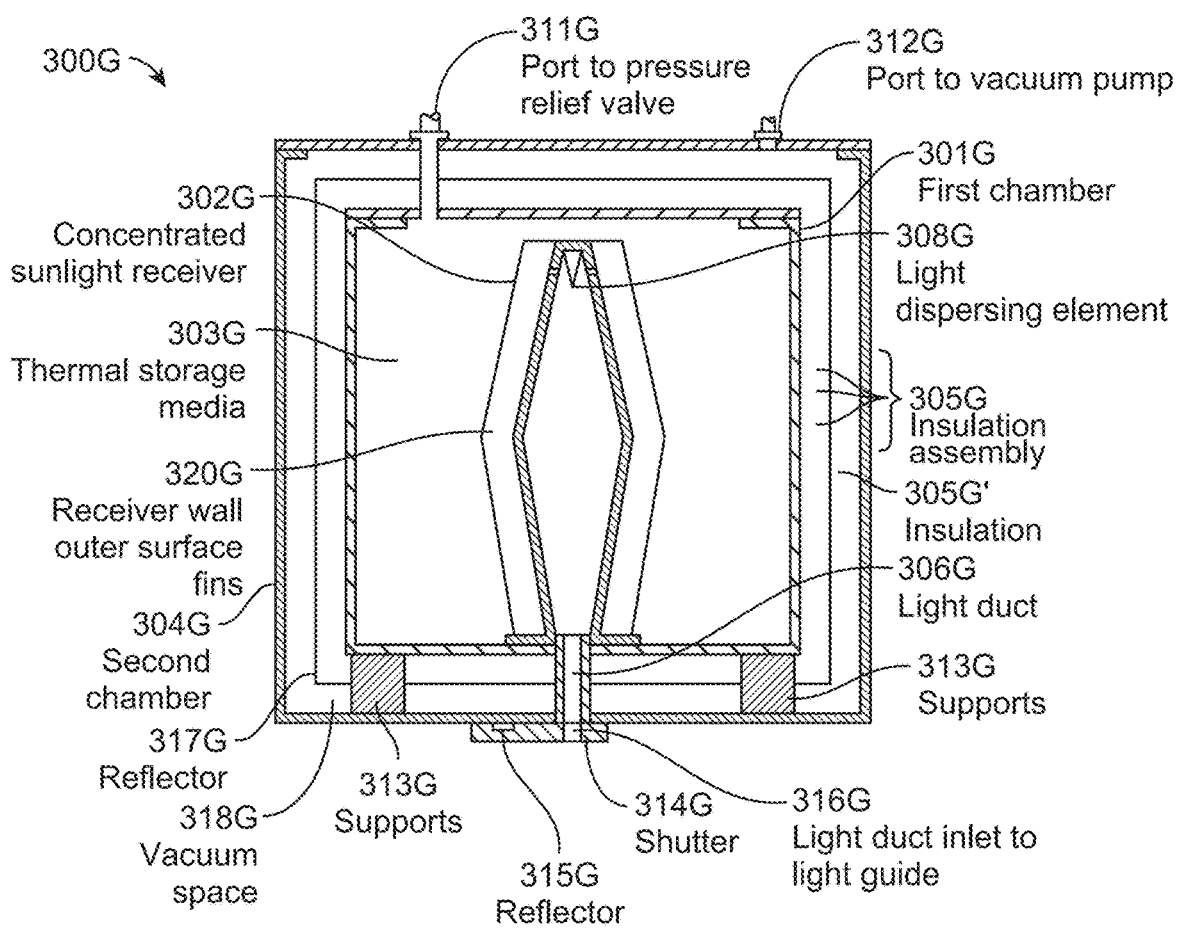

300G

311G
Port to pressure
relief valve

312G
Port to vacuum pump

302G
Concentrated
sunlight receiver

301G
First chamber

308G
Light
dispersing element

303G
Thermal storage
media

305G
Insulation
assembly

305G'
Insulation

320G
Receiver wall
outer surface
fins

306G
Light duct

304G
Second
chamber

313G
Supports

317G
Reflector

318G
Vacuum
space

313G
Supports

315G
Reflector

314G
Shutter

316G
Light duct inlet to
light guide

FIG. 3G

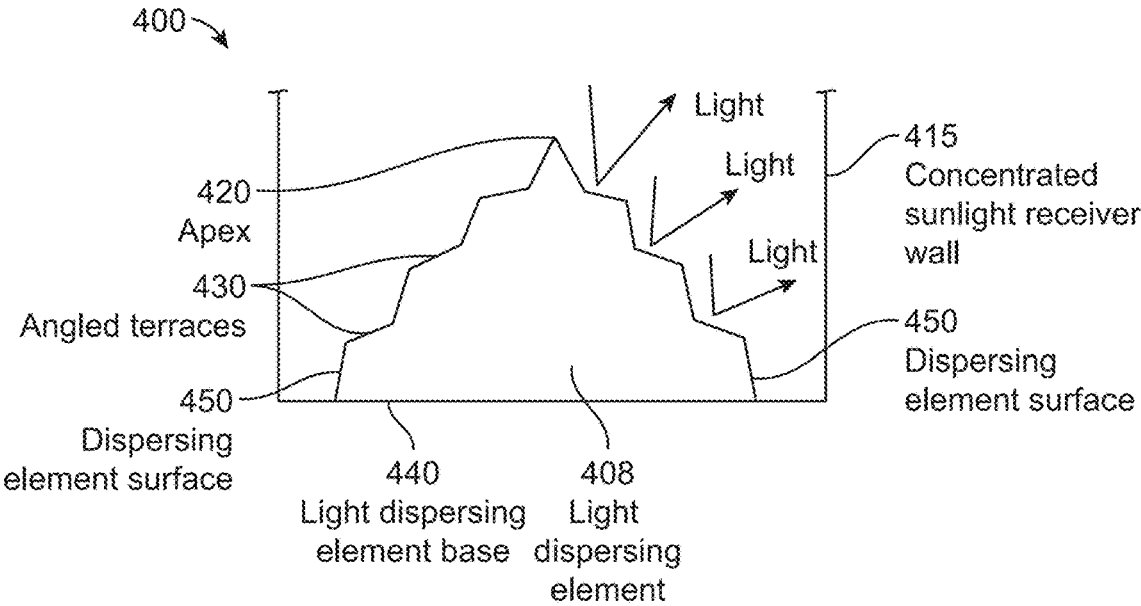

400

420
Apex

430
Angled terraces

450
Dispersing
element surface

Light

Light

Light

415
Concentrated
sunlight receiver
wall

450
Dispersing
element surface

440
Light dispersing
element base

408
Light
dispersing
element

FIG. 4

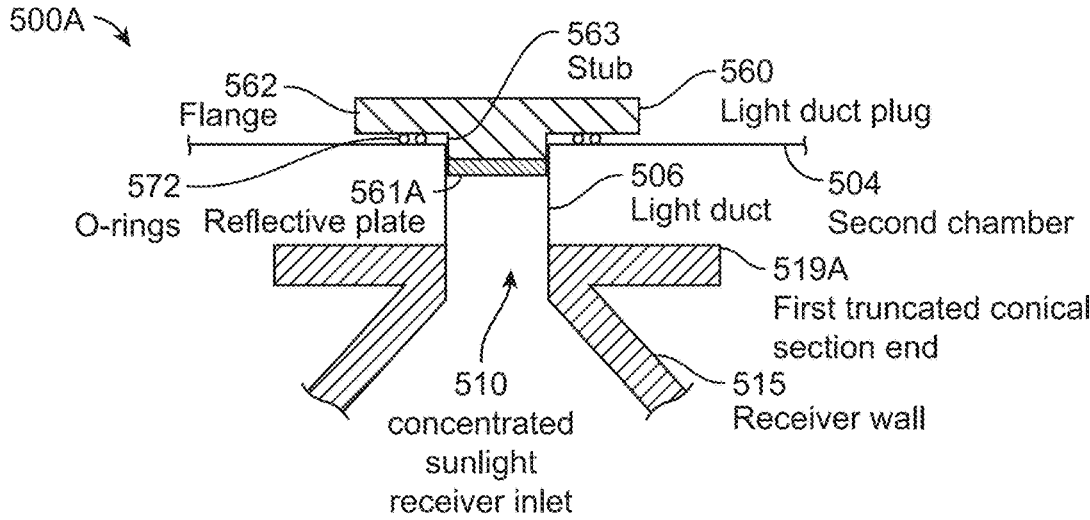

500A

563
Stub

562
Flange

560
Light duct plug

572
O-rings

561A
Reflective plate

506
Light duct

504
Second chamber

519A
First truncated conical section end 510
concentrated sunlight receiver inlet 515
Receiver wall

FIG. 5A

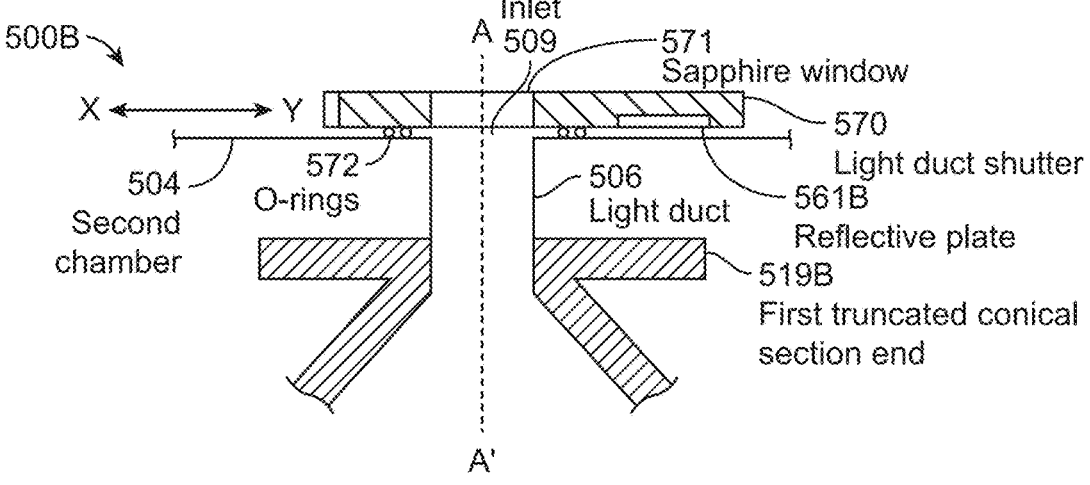

500B

Inlet
A 509

571
Sapphire window

X ← → Y

570
Light duct shutter

504
Second chamber

572
O-rings

561B
Reflective plate

506
Light duct

519B
First truncated conical section end

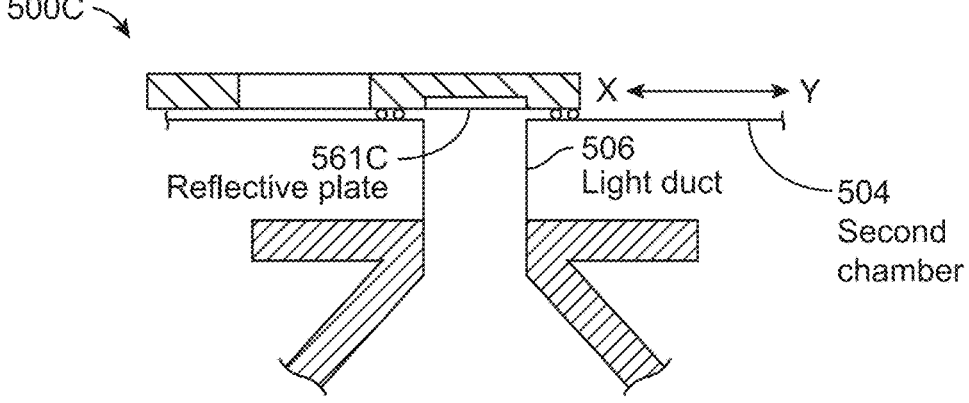

500C

X ← → Y

561C
Reflective plate

506
Light duct

504
Second chamber

601
First chamber 677
evacuated space

676
Reflective liner

604
Second chamber

675
First insulation material

700A

Struts
782'

782
secondary mirror

785
Opening 781
primary mirror

700
Solar
concentrator

783
Light guide
system

784
Thermal energy
storage system

700B

787
Second swivel
duct section

788
Third swivel duct
section $\Omega_3$ $\Omega_2$ $\Omega_1$

706
Light duct

786
First swivel
duct Section

702
Concentrated
sunlight
receiver

800A

Secondary mirror
882

Opening
885

881
Primary mirror

Railing
889

888
Back reflector

Sunlight

EL

883
Light guide
system

806
Light duct

884
Thermal energy
storage system

802
Concentrated
sunlight receiver

800B

Elevation

806
Light duct

TES

802
Concentrated
sunlight receiver

900A

Secondary mirror
982

981
Primary mirror

990 First flat mirror

900
Solar
concentrator

992
Down tube

991
Second flat
mirror

906
Light duct

984
Thermal energy
storage system

902
Concentrated
sunlight receiver

900B

990
First flat
mirror

991
Second flat
mirror

990'
First flat
mirror

991'
Second flat
mirror

984
Thermal energy
storage system

906
Light duct

MODULAR SOLAR ENERGY HARVESTING AND STORAGE SYSTEMS FOR POWER GENERATION

RELATED APPLICATIONS

This patent application is a continuation-in-part application of and claims priority to U.S. patent application Ser. No. 18/753,599 entitled "THERMAL ENERGY STORAGE SYSTEMS AND METHODS" and filed on Jun. 25, 2024, which claims priority to U.S. Provisional Patent Application No. 63/523,267 entitled "THERMAL ENERGY STORAGE SYSTEMS AND METHODS" and filed on Jun. 26, 2023, and to U.S. Provisional Patent Application No. 63/661,153 entitled "THERMAL ENERGY STORAGE SYSTEMS AND METHODS" and filed on Jun. 18, 2024, both of which are assigned to the assignee hereof. The disclosures of all prior applications are considered part of and are incorporated by reference in this patent application in their respective entireties.

TECHNICAL FIELD

This disclosure relates to thermal energy storage systems and methods that include near-black body concentrated sunlight receivers disposed in thermal storage media for storing concentrated sunlight and extracting stored thermal energy for multiple end-use applications including offshore solar energy harvesting and storage systems for onshore power generation and solar energy harvesting and storage systems to enhance power generation per acre on land.

BACKGROUND

In contrast to photovoltaic ("PV") panels used to convert sunlight to electricity in residential and commercial applications, concentrating solar power ("CSP") systems capture solar energy using a collector, concentrate solar energy into a receiver, and may store the captured solar energy as thermal energy. In general, CSP systems reflect and concentrate sunlight into a receiver using a system of mirrors. Heat from the hot receiver may then be transferred using heat transfer media to generate steam and produce electricity using a turbine and related power systems in a decarbonized electric grid. Alternately, thermal energy may be stored for various industrial applications. CSP systems at utility-scale are typically configured as linear concentrator systems or as solar power tower ("SPT") systems.

Linear concentrator CSP systems include parabolic trough collectors ("PTC"), in which large mirrors are disposed in parallel rows to reflect and focus sunlight to linear receiver tubes disposed along the focal line of each parabola-shaped reflector or parabolic trough reflector. The collectors may be moved using a single-axis sun-tracking system to maximize sunlight collection throughout the day. The receiver tubes are typically fixed to the trough reflector. A suitable heat transfer fluid may be heated by heat exchange with the hot receiver tubes and may be used to generate steam to run a turbine connected to a generator to produce electricity. Heat may also be stored in a thermal storage system in a suitable thermal storage media. Stored thermal energy may be extracted when needed using a heat transfer fluid.

Linear concentrator systems may use linear Fresnel reflectors ("LFR") instead of parabolic trough reflectors. Linear Fresnel reflectors employ flat or slightly curved mirrors movable using a tracking system to reflect sunlight onto a receiver tube fixed above the mirrors. A second smaller parabolic mirror may be disposed between the reflectors and the receiver to further focus the sunlight into the receiver tubes.

In solar power tower ("SPT") CSP systems, thousands of flat, sun-tracking mirrors may focus sunlight to a receiver typically located at an elevation and disposed in a centrally located tall tower. The flat mirrors are known as heliostats. A heat-transfer fluid may be used to transfer heat from the receiver, and to produce steam to run a steam turbine in a typical power cycle. Heat may also be stored in molten salts in a thermal storage system.

CSP systems also include parabolic dish systems ("PDS"). In PDS, a dish-shaped reflector, which may be shaped like a commonly known satellite dish, concentrates sunlight onto a thermal receiver, which absorbs concentrated solar energy and transfers heat to an engine or stores heat for use in an end-application. The thermal receiver may include bundle of tubes that use a heat transfer fluid to transfer heat from the receiver to an engine, such as a Stirling engine. The heat transfer fluid may include water, hydrogen or helium. The dish may be mounted on a tracker system that tracks the sun through the day to increase the sunlight reflected to a thermal receiver. In contrast to the other utility-scale CSP technologies, PDS may be modular in design and may be used to produce less than 100 kWe of electricity.

FIG. 1 provides an illustration 100 that compares key metrics of the CSP technologies described above (Xu et al., 2016). As can be seen, the PDS technology is hampered primarily by a lack of modular high efficiency thermal energy storage systems. The thermal energy storage systems employed in the current CSP technologies are more suited for utility-scale (megawatt) power generators. Thermal energy storage systems may generally include a two-tank direct system, two-tank indirect system, or single-tank thermocline system. In a two-tank direct system, a single heat transfer fluid, for example, molten salt or mineral oil is routed from a low-temperature tank and through the solar receiver where it is heated to an elevated temperature. The hot heat transfer fluid is stored in a high-temperature tank. The hot heat transfer fluid generates steam from water using a suitable heat exchanger system. The fluid exiting the system is routed to the low-temperature tank.

A two-tank indirect system typically uses two different heat transfer fluids. A first fluid (low-temperature fluid) is stored in a low-temperature tank and is heated by heat exchange with a second fluid (high-temperature fluid) stored in a high-temperature tank. The high-temperature storage fluid is then routed back to receiver to pick-up heat and is returned back to the high-temperature storage tank.

Alternately, CSP systems may employ a single-tank "thermocline" system that stores thermal energy in a solid medium such as sand or gravel. As the name suggests, the thermocline system is characterized by a temperature gradient region disposed between a high-temperature region and a low-temperature region. Heat transfer fluid enters the low-temperature region, gets heated as it flows through the storage medium, and exits the storage medium at high temperature and is used to generate steam.

According to the U.S. Department of Energy (2020), improvements in solar capture and thermal energy storage systems are needed to reach the 2030-goal of 5 cents per kilowatt-hour for baseload power plants with greater than 10 hours of thermal energy storage.

BRIEF DISCLOSURE

This summary is provided to introduce in a simplified form a selection of concepts that are further described below in the Detailed Description section. This Summary is not intended to identify key features or essential features of the claimed subject matter, nor is it intended to limit the scope of the claimed subject matter.

In some implementations, an offshore solar energy harvesting and storage system disposed on a watercraft may include a sunlight to thermal energy conversion system including one or more thermal energy storage systems, as described below in this disclosure, for storing thermal energy produced from concentrated sunlight. Each thermal energy storage system may include one or more concentrated sunlight receivers disposed in thermal contact with thermal energy storage media, a first chamber configured to house the one or more concentrated sunlight receivers and the thermal energy storage media, a second chamber substantially encapsulating the first chamber and separated from the first chamber by an insulation assembly, and a light duct disposed between a respective thermal energy storage system inlet and an inlet associated with each of the respective one or more concentrated sunlight receivers. An example offshore solar energy harvesting and storage system may include one or more solar concentrators disposed on a deck of the watercraft. Concentrated sunlight from each of the one or more solar concentrators may be transferred to the one or more thermal energy storage systems using one or more optical light guides.

In some implementations, an example offshore solar energy harvesting and storage system may further include a sun tracking system, and a controller configured to perform one or more of optimizing solar energy harvesting and storage by moving each of the one or more solar concentrators using the sun tracking system, wherein each of the one or more solar concentrators is disposed on an azimuth-elevation (Az-El) mount coupled to the sun tracking system, and initiating the movement of the watercraft offshore to one or more predetermined latitude and longitude coordinates for harvesting solar energy and maintaining the orientation of the watercraft to the sun irrespective of wind and wave conditions offshore.

In some implementations, an example method for harvesting solar energy offshore and generating electricity onshore, may include disposing any one of offshore solar energy harvesting and storage systems described herein on a watercraft using a controller associated with the offshore solar energy harvesting and storage system, performing one or more operations including, initiating the movement of the watercraft offshore to one or more predetermined latitude and longitude coordinates for harvesting solar energy and maintaining the watercraft's orientation to the sun, optimizing solar energy harvesting and storage by moving each of the one or more solar concentrators using a sun tracking system, wherein each of the one or more solar concentrators is disposed on an azimuth-elevation (Az-El) mount coupled to the sun tracking system, determining whether an energy capacity associated with the thermal energy storage system meets or exceeds a predetermined energy capacity, initiating the movement of the watercraft to a port or shore and docking, and transferring thermal energy from the thermal energy storage system to an energy conversion device located onshore.

In some implementations, a watercraft for harvesting solar energy offshore and generating electricity onshore may include any one of the offshore solar energy harvesting and storage systems described herein, and a controller associated with the offshore solar energy harvesting and storage system, configured to perform one or more operations including initiating the movement of the watercraft offshore to one or more predetermined latitude and longitude coordinates for harvesting solar energy and maintaining the watercraft's orientation to the sun, optimizing solar energy harvesting and storage by moving each of the one or more solar concentrators using a sun tracking system, wherein each of the one or more solar concentrators is disposed on an azimuth-elevation (Az-El) mount coupled to the sun tracking system, determining whether an energy capacity associated with the thermal energy storage system meets or exceeds a predetermined energy capacity, initiating the movement of the watercraft to a port or shore and docking, and transferring thermal energy from the thermal energy storage system to an energy conversion device located onshore. In some implementations, A solar energy harvesting and storage system including:

In some implementations, a sunlight to thermal energy conversion system may include a thermal energy storage system for storing thermal energy produced from concentrated sunlight (as described herein). An example thermal energy storage system may include one or more concentrated sunlight receivers disposed in thermal contact with thermal energy storage media, a first chamber configured to house the one or more concentrated sunlight receivers and the thermal energy storage media, a second chamber substantially encapsulating the first chamber and separated from the first chamber by an insulation assembly and a light duct disposed between a thermal energy storage system inlet and an inlet associated with each of the respective one or more concentrated sunlight receivers, and one or more solar concentrators disposed on a support tower or wall, wherein concentrated sunlight from each of the one or more solar concentrators is transferred to the thermal energy storage system using one or more optical light guides.

In some instances, an example sunlight to thermal energy conversion system may further include a sun tracking system and a controller configured to optimize solar energy harvesting and storage by moving each of the one or more solar concentrators using the sun tracking system, wherein each of the one or more solar concentrators is disposed on an azimuth-elevation (Az-El) mount coupled to the sun tracking system.

In some implementations, an example thermal energy storage system for storing thermal energy produced from concentrated sunlight may include a concentrated sunlight receiver disposed in thermal contact with thermal energy storage media, a first chamber configured to house the concentrated sunlight receiver and the thermal energy storage media, a second chamber substantially encapsulating the first chamber and separated from the first chamber by an insulation assembly, and a light duct disposed between a thermal energy storage system inlet and a concentrated sunlight receiver inlet. The concentrated sunlight receiver may include a light dispersing element disposed opposite to the concentrated sunlight receiver inlet and configured to disperse concentrated sunlight towards one or more walls of the concentrated sunlight receiver. The light dispersing element may be characterized by a reflectivity of at least 0.80. The one or more surfaces of the light dispersing element may be characterized by a surface roughness Ra of less than about 2 $\mu$m. In some implementations, the light dispersing element may be made of one of stainless steel type 304, stainless steel type 316, Inconel, Hastelloy, or Haynes alloys. In some aspects, the light dispersing element may be conical in shape. In some other aspects, the one or more surfaces of the light dispersing element extending from a base to an apex of the light dispersing element may include a plurality of angled terraces.

In some implementations, the concentrated sunlight receiver in an example thermal energy storage system may include a receiver wall inner surface and a receiver wall outer surface. The receiver wall inner surface may be characterized by a surface roughness Ra of at least 10 μm. In some implementations, the concentrated sunlight receiver may include a receiver wall inner surface and a receiver wall outer surface, wherein the receiver wall inner surface may be black anodized or painted black. In some implementations, the receiver wall inner surface may include a plurality of inner surface grooves extending into the receiver wall. In some aspects, the receiver wall inner surface grooves may include a plurality of V-shaped, trapezoidal, or square grooves. In some implementations, the receiver outer surface may include a plurality of receiver wall outer surface fins extending into the thermal energy storage media.

In some implementations, the concentrated sunlight receiver may be cylindrical, spherical, or conical in shape. In some other implementations, the concentrated sunlight receiver may be in the shape of a lava-lamp characterized by first truncated conical section and second truncated conical section joined at a common base.

In some implementations, an example thermal energy storage system may further include a light duct plug including a flange and a stub (which may also be referred to herein as a flange plug). A reflective plate may be disposed on the surface of the stub that is opposite to parallel to the flange. In some implementations, an example thermal energy storage system may further include a light duct shutter. The shutter may include a sapphire window and a reflective plate disposed adjacent to and spaced apart from each other.

In some implementations, the concentrated sunlight receiver may be made of one or more of copper, aluminum, GRCop-84, GlidCop AL-15, Cu—Cr alloys, Cu—Cr—Zr alloys, Al-MS89, or aluminum alloy 6061 T6. In some implementations, the first chamber in an example thermal energy storage system may be made of one or more of alumina, carbon steel, stainless steel type 304, stainless steel type 316, or superalloys. In some aspects, superalloys may include one or more of Inconel, Hastelloy, or Haynes alloys. In some implementations, the second chamber in an example thermal energy storage system may be made of one or more of carbon steel, stainless steel type 304, or stainless steel type 316.

In some implementations, an insulation assembly in an example thermal energy storage system may include a first insulation material sandwiched between the first chamber and the second chamber and an evacuated space disposed between the second chamber and the first chamber. In some instances, an example insulation system may include a reflective liner. In some aspects, the insulation assembly may further include a second insulation disposed outside the second chamber. In some aspects, the first insulation material may include one or more of perlite, vermiculite, glass beads, mineral wool, ceramic fiber, fiberglass, aerogel, alumina, or firebrick.

In some implementations, the thermal energy storage media may include one or more of aluminum, carbon steel dispersed in aluminum, eutectoid steel dispersed in aluminum, interleaved copper and carbon steel plates, wherein the copper plates are in thermal contact with the concentrated sunlight receiver, interleaved copper and eutectoid steel plates, wherein the copper plates are in thermal contact with the concentrated sunlight receiver, heat transfer fluid capable of heat storage of up to 350° C., or carbon steel immersed in high temperature heat transfer fluid capable of heat storage of up to 350° C. In some implementations, the eutectoid steel may include carbon steel having about 0.8% carbon. In some implementations, the eutectoid steel content (vol %) may be greater than the aluminum content (vol %) in the eutectoid steel dispersed in aluminum thermal storage media. In some implementations, an example thermal storage media including eutectoid steel and dispersed in aluminum may include 30 vol % aluminum and 70 vol % eutectoid steel.

In some implementations, a sunlight-to-thermal energy conversion system may include a solar concentrator and any one the thermal energy storage systems previously described herein. In some implementations, the solar concentrator and the thermal energy storage system may be configured to be detachable from each other. In some implementations, sunlight from the solar concentrator may be directly injected using free space optics or optical components into the thermal energy storage system. In some implementations, an example sunlight to thermal energy conversion system may include one or more microcontrollers configured to control the operation of the sunlight to thermal energy conversion system. In some implementations, the example solar concentrator may include one or more of Nasmyth-Coudé solar concentrators, or Cassegrain solar concentrators.

In some implementations, a solar concentrator may further include a light guide system configured to direct concentrated sunlight from the solar concentrator directly to the concentrated sunlight receiver through an inlet of the receiver. In some implementations, the light guide system may include a plurality of swivel light duct sections. Each swivel light duct section may be joined to adjacent sections using swivel bearings to independently orient each section at different angles with respect to the center line of the inlet of the concentrated sunlight receiver. Additionally, an example light guide system may include a sun tracking system to independently move and orient the plurality of swivel light duct sections. The operation of the sun tracking system may be controlled using the one or more microcontrollers.

In some implementations of an example thermal energy conversion system, the sun tracking system may include a motor to drive a pinion gear attached to one light duct section and configured to turn spur gear rings attached to the adjacent light duct sections. The plurality of swivel light duct sections may direct concentrated sunlight directly into the light duct inlet of the thermal energy storage system. In some implementations, the plurality of swivel light duct sections may include reflective interior surfaces. In some implementations, the interior surfaces of each light duct section may be coated with a reflective material including one or more of gold, silver, or aluminum.

In some implementations of an example thermal energy conversion system, the light guide system may include a sun tracking system to direct concentrated sunlight directly into the light duct inlet. The operation of the sun tracking system may be controlled using the one or more microcontrollers. In some implementations, the light duct may include reflective interior surfaces. The reflective interior surface of the light duct may be coated with a reflective material including one or more of gold, silver, or aluminum.

In some implementations, any one of the thermal energy storage systems previously described herein may further include heat extraction means disposed in thermal communication with the thermal energy storage media. In some aspects, the heat extraction means may include a heat transfer coil disposed in contact with the first chamber and between the first chamber and the second chamber. In some aspects, the heat extraction means may include a heat transfer coil disposed within the first chamber. The heat transfer fluid may be passed through the coil to remove heat from the thermal storage media for use in an energy conversion device. In other aspects, the heat extraction means may include an outer jacket of the first chamber, wherein the jacket is disposed between the insulation assembly and the first chamber, wherein a heat transfer fluid is passed thorough the jacket to remove heat from the thermal storage media for use in an energy conversion device.

In some implementations, the heat extraction means may include circulating heat transfer fluid through the first chamber, wherein a heat transfer fluid removes heat from the thermal storage media for use in an energy conversion device. In some implementations, the heat extraction means may include one or more of a heat pipe or thermosyphon system, wherein heat is transferred from the thermal energy storage media to an energy conversion device. In some aspects, the heat extraction means may include means to flow a gaseous heat transfer fluid through the thermal energy storage media. In some implementations, an example thermal energy storage system described herein may further include one or more pressure relief valves to maintain the pressure inside the first chamber below a predetermine pressure set point.

In some implementations, a sunlight to thermal energy conversion system may include a solar concentrator, any one of the thermal energy storage systems previously described herein. wherein the solar concentrator and the thermal energy storage system may be configured to be detachable from each other, and one or more microcontrollers, wherein the one or more microcontrollers control the operation of the sunlight to thermal energy conversion system. In some implementations, the sunlight to thermal energy conversion system may further include a liquid light guide configured to transfer concentrated sunlight from the solar concentrator to the thermal storage system. The liquid light guide may include fluorinated ethylene propylene (FEP) polymer tubing filled with mineral oil. In some implementations, a sunlight to thermal energy conversion system may further include a fiber optic bundle to transfer concentrated sunlight from the solar concentrator to the thermal storage system.

In some implementations, a thermal energy storage system for storing thermal energy produced from concentrated sunlight may include a concentrated sunlight receiver disposed in thermal contact with thermal energy storage media. In some instances, the concentrated sunlight receiver may be in the shape of a lava lamp characterized by a first truncated conical section and second truncated conical section joined at a common base. The thermal energy storage system may further include a first chamber configured to house the concentrated sunlight receiver and the thermal energy storage media, a second chamber substantially encapsulating the first chamber and separated from the first chamber by an insulation assembly, and a liquid light guide configured to transfer concentrated sunlight from a solar concentrator to the thermal energy storage system.

In some instances, an example thermal energy storage system may be configured to prevent a liquid leaking from the liquid light guide from entering into one or more of the thermal energy storage system or the concentrated sunlight receiver. In some other instances, the concentrated sunlight receiver may include a light dispersing element disposed opposite to a concentrated sunlight receiver inlet and configured to disperse concentrated sunlight towards one or more walls of the concentrated sunlight receiver. In some instances, the light dispersing element may be conical in shape.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 1 shows a comparison of key metrics of concentrated solar power technologies.

FIG. 2A shows a perspective view of an example thermal energy storage system, according to some implementations.

FIG. 2B shows a schematic cross-sectional view of an example thermal energy storage system, according to some implementations.

FIG. 3G shows a schematic cross-sectional view of another example thermal energy storage system, according to some implementations.

FIG. 4 shows a schematic diagram of a light dispersing element, according to some implementations.

FIG. 5A shows a schematic diagram of a partial view of an example concentrated sunlight receiver that includes a light duct plug, according to some implementations.

FIG. 5B shows a schematic diagram of a partial view of an example concentrated sunlight receiver that includes a light duct shutter, according to some implementations.

FIG. 5C shows a schematic diagram of a partial view of an example concentrated sunlight receiver that includes a light duct shutter, according to some implementations.

Like reference numbers and designations in the various drawings indicate like elements.

DETAILED DESCRIPTION

Figure 3A:
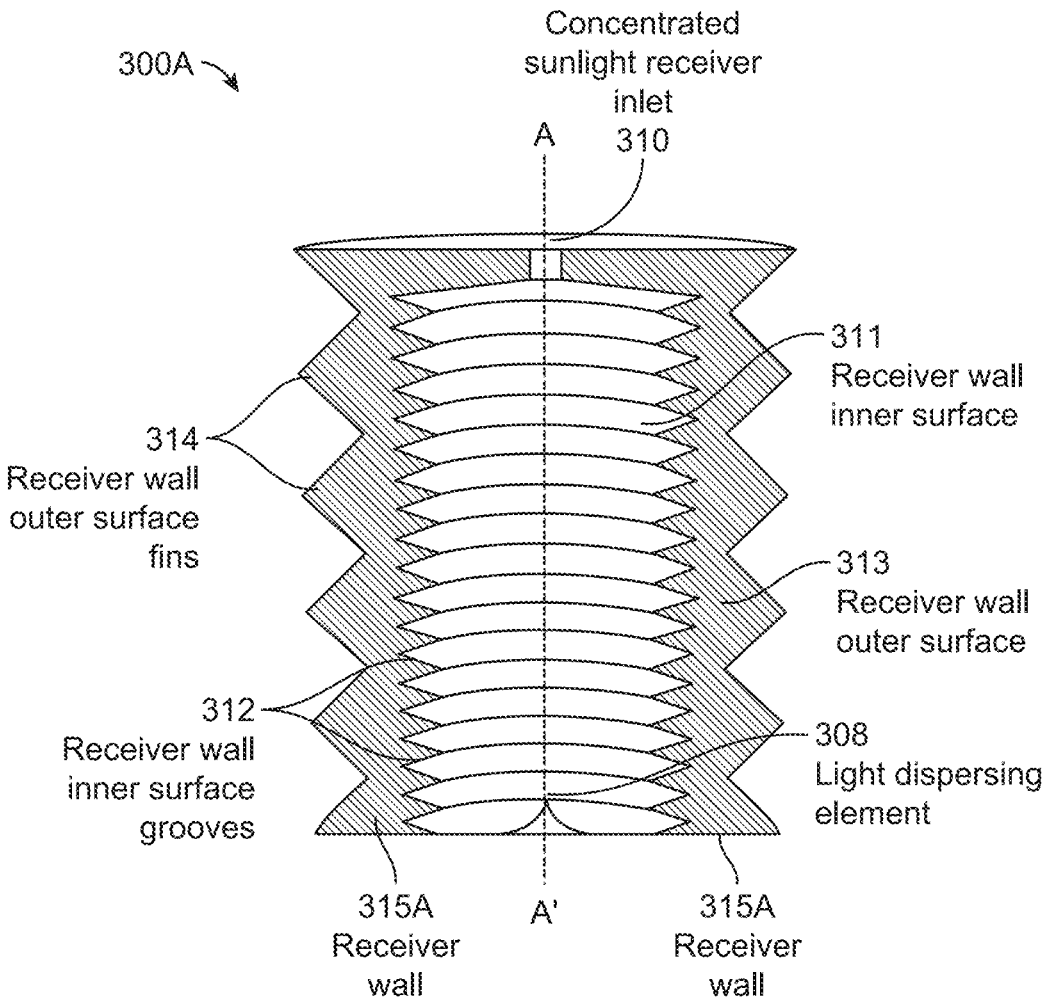
FIG. 3A shows a schematic diagram of a concentrated sunlight receiver, according to some implementations.

The following description is directed to some example implementations for the purpose of describing the innovative aspects of this disclosure. However, a person having ordinary skill in the art will readily recognize that the teachings herein can be applied in a multitude of different ways. The described implementations can be implemented in thermal batteries for a variety of applications and may be tailored to compensate for various performance related deficiencies. As such, the disclosed implementations are not to be limited by the examples provided herein, but rather encompass all implementations contemplated by the attached claims. Additionally, well-known elements of the disclosure will not be described in detail or will be omitted so as not to obscure the relevant details of the disclosure.

Various aspects of the novel compositions and methods are described more fully herein with reference to the accompanying drawings. These aspects are provided so that this disclosure will be thorough and complete, and will fully convey the scope of the disclosure to those skilled in the art. Although some examples and aspects are described herein, many variations and permutations of these examples fall within the scope of the disclosure. Although some benefits and advantages of the various aspects are mentioned, the scope of the disclosure is not intended to be limited to benefits, uses, or objectives. The detailed description and drawings are merely illustrative of the disclosure rather than limiting, the scope of the disclosure being defined by the appended claims and equivalents thereof.

In this disclosure, an ideal black body object is an object that has perfect absorption of all incident radiation, regardless of direction or wavelength. It has a value of 0 for reflectivity and a value of 0 for transmissivity at all wavelengths. According to Kirchoff's law of radiation, for a surface or body emitting and absorbing thermal radiation in thermodynamic equilibrium, the emissivity is equal to the absorptivity of the surface or body. As such, an ideal black body object has a value of 1 for absorptivity at all wavelengths, and a value of 1 for emissivity ($\varepsilon$). Absorptivity ($\alpha$) is a measure of how much of incident radiation is absorbed by an object. Reflectivity ($\rho$) is a measure of how much of incident radiation is reflected, and transmissivity ($\tau$) is a measure of how much of radiation passes through the object. Each of these parameters may have a value ranging from 0 to 1. For any given wavelength ($\lambda$) of incident light, $$\alpha_\lambda + \rho_\lambda + \tau_\lambda = 1$$

When sunlight is incident on an object, it may be absorbed by the surface or surfaces of the object, resulting in a change in temperature of that object. Sunlight may also be reflected from the surface or surfaces of the object, resulting in no temperature change. Sunlight may also be transmitted through the object, resulting in no temperature change. A heated object may emit radiation defined by an emissivity ($\varepsilon$), which may have a value from 0 (for a shiny mirror) to 1.0 (for an ideal black body object). For example, painted or oxidized surfaces may have emissivity values of about 0.95. Emissivity may be viewed as a measure of the ability of a surface to emit infrared energy. Emitted energy may be indicative of the temperature of the surface of an object that emits radiation.

In this disclosure, several implementations of "concentrated sunlight receivers" are disclosed. "Concentrated sunlight receiver" means a receiver or body that approaches the behavior of an ideal black body object, as previously described. The example concentrated sunlight receivers are configured to absorb greater than 90% of sunlight that enters the receiver. Concentrated sunlight is directly injected into the concentrated sunlight receiver. In other implementations, concentrated sunlight may be routed into the concentrated sunlight receiver via fiber optic cables or a liquid light tube. By absorbing concentrated sunlight, the temperature of the concentrated sunlight receiver increases. Thermal energy is transferred by conduction and radiation through the walls of the concentrated sunlight receiver to a thermal storage media. The various implementations disclosed below provide more details on the construction and performance of the example concentrated sunlight receiver when used in example thermal storage systems.

FIG. 2A shows a perspective view of an example thermal energy storage system 200A, according to some implementations. Example thermal energy storage system 200A may minimize thermal losses. FIG. 2B shows a schematic cross-sectional view of an example thermal storage system 200B, according to some implementations. An example thermal storage system 200B for storing thermal energy produced using concentrated sunlight may include a concentrated sunlight receiver 202 disposed in thermal communication or in thermal contact with thermal energy storage media 203. As shown in FIG. 2B, the concentrated sunlight receiver 202 may be immersed or otherwise disposed in direct heat-transfer contact with thermal energy storage media 203. Concentrated sunlight receiver 202 may be embedded within thermal energy storage media 203. Thermal energy storage system 200A or 200B may include a first chamber 201 configured to house both the concentrated sunlight receiver 202 and thermal storage media 203. A second chamber 204 may substantially surround or encapsulate the first chamber 201. An insulation assembly may be disposed in the gap or space 205 between the first chamber 201 and second chamber 204. The insulation assembly (see FIG. 6) is configured to minimize overall heat loss from the first chamber 201 by minimizing radiation, convection, and conduction heat transfer to the second chamber 204.

Example thermal storage system 200A or 200B may include a thermal energy storage system inlet 209. Thermal energy storage inlet 209 may be configured to receive concentrated sunlight from a solar concentrator system, which may be disposed external to the thermal storage system. Concentrated sunlight may be directly injected into the thermal energy storage inlet 209 (or light duct inlet 209) using free space as illustrated by way of example in FIGS. 7A-7B, 8A-8B, 9A-9B. Alternately, concentrated sunlight may be directed into the thermal energy storage inlet 209 (or light duct inlet 209) using an optical light guide as illustrated by way of example in FIG. 10 and FIG. 12. Light duct 206 may be disposed between thermal energy storage system inlet 209 and concentrated sunlight receiver inlet 210. The interior surface of light duct 206 interior may be coated with highly reflective material or may be polished to a high reflectivity. In some implementations, the thermal energy storage system 200A may include a pressure relief valve (not shown for simplicity) to vent any excess pressure in the first chamber and to maintain the pressure in the first chamber at about atmospheric pressure. In some implementations, first chamber 201 may be made of one or more of alumina, carbon steel, stainless steel (e.g., stainless steel 304, stainless steel 316) or superalloy including Inconel, Hastelloy, or Haynes alloy. Inconel alloys may include the Inconel 625 alloy. Hastelloy may include Hastelloy X. Haynes alloy may include Haynes 230 alloy. In some implementations, the second chamber 204 may be made of one or more of carbon steel or stainless steel (e.g., stainless steel 304 or stainless steel 316).

In some implementations, concentrated sunlight receiver 202 may be made of one or more of copper, GRCop-84, GlidCop AL-15, Cu—Cr alloys, Cu—Cr—Zr alloys, aluminum, Al-MS89, or aluminum alloy 6061 T6. The choice of metal for receiver 202 may depend on the expected maximum temperature within receiver 202. Copper or alloys of copper may be used for temperatures of up to about 800° C. Aluminum may be used for temperatures of up to about 300° C. In some implementations, concentrated sunlight receiver 202 may be made of naturally oxidized copper. Oxidized copper may have an emissivity of about 0.7. To increase emissivity, the copper or aluminum surfaces of concentrated sunlight receiver 202 may be treated with black paint. In some implementations, the copper or aluminum surfaces may be black anodized. In general, black anodizing refers to the process of blackening an aluminum or copper surface by first oxidizing the metal surfaces to form a porous metal oxide layer. The metal oxide layer may then be dyed black using one or more of organic dyes, inorganic dye, or electrolytic dyeing using metal salts. Concentrated sunlight receiver 202 made of copper or aluminum may conduct heat out from the receiver to the thermal energy storage 203. Copper and aluminum possess high thermal diffusivity and thermal conductivity. The thermal conductivity of copper is about 400 W/m/K. The thermal conductivity of aluminum is about 235 W/m/K. The thermal diffusivity of copper is about 1.1 cm²/s. The thermal diffusivity of aluminum is about 0.97 cm²/s. In general, materials such as copper and aluminum with a high thermal diffusivity heat or cool quickly. In some implementations, concentrated sunlight receiver 202 may be assembled from several parts including sides and bottom brazed or welded together, a light dispersing element, and a removable top including an inlet. In some implementations sections (e.g., as shown in FIGS. 3E-3F) may be bolted or otherwise fastened together.

FIG. 3A shows a schematic diagram of a concentrated sunlight receiver 300A, according to some implementations. In some implementations, concentrated sunlight receiver 300A may be cylindrical in shape. Example concentrated sunlight receiver 300A may include concentrated sunlight receiver inlet 310 disposed in fluid (or optical) communication with light duct 206 and thermal energy storage system inlet or light duct inlet 209 (as shown in FIG. 2B). As previously described, concentrated sunlight may be directly injected into the thermal energy storage inlet 209 (or light duct inlet 209) using free space optics as illustrated by way of example in FIGS. 7A-7B, 8A-8B, 9A-9B. Alternately, concentrated sunlight may be directed into the thermal energy storage inlet 209 (or light duct inlet 209) using an optical light guide as illustrated by way of example in FIG. 10 and FIG. 12.

Light dispersing element 308 (shown more clearly as reference numeral 208 in FIG. 2B) may be disposed opposite to the concentrated sunlight receiver inlet 310 and may be configured to disperse or reflect concentrated sunlight light towards the receiver wall 315A of receiver 300A and minimize loss of concentrated sunlight out through the receiver inlet 310. In some implementations, light dispersing element 308 may be bolted or otherwise fastened to the bottom of the receiver inner wall. Alternately, light dispersing element may be a monolithic part machined from the same metal stock as the receiver. Light dispersing element 308 may be shaped and positioned at the bottom of the receiver 315 (opposite to the concentrated sunlight receiver inlet 310) to reflect incident light in a wide range of angles to illuminate the receiver wall inner surface 311. Receiver 300A may be configured to enable multiple reflections of non-absorbed concentrated sunlight dispersed by light dispersing element 308 (shown more clearly as element 208 in FIG. 2B) towards the receiver wall 315A, to increase absorption of sunlight by the receiver wall. The receiver wall 315A heats up due to absorption of sunlight. The heat generated is transferred by conduction and radiation to the thermal storage media 203 (as shown in FIG. 2B), thereby converting sunlight (light energy) to heat (thermal energy) and storing the generated thermal energy in the thermal storage media 203. In some implementations, to urge as many reflections as possible within the concentrated sunlight receive, the receiver inlet 310 may be configured to be as small as possible, and the length of the concentrated sunlight receiver may be increased relative to its diameter or lateral dimension.

In some implementations, the receiver wall outer surface 313 (as shown in FIG. 3A) may include a plurality of receiver wall outer surface fins 314 that extend away from a longitudinal axis (A-A') of the concentrated sunlight receiver and into the thermal energy storage media 203 when receiver 300A is disposed in first chamber 201 (as shown in FIG. 2B). The receiver wall outer surface fins 314 may increase the surface area available for heat transfer and thereby increase heat transfer by conduction from the receiver 300A to the storage media 203. In some implementations, the receiver wall inner surface 311 may include a plurality of receiver wall inner surface grooves 312. In some implementations, the receiver wall inner surface 311 may be configured to promote diffuse reflection and increase the number of reflections of unabsorbed concentrated sunlight inside receiver 300A to maximize absorption of concentrated sunlight and subsequent conversion of light to thermal energy and minimize losses through the concentrated sunlight receiver inlet 310.

Figures 3B, 3C, 3D:
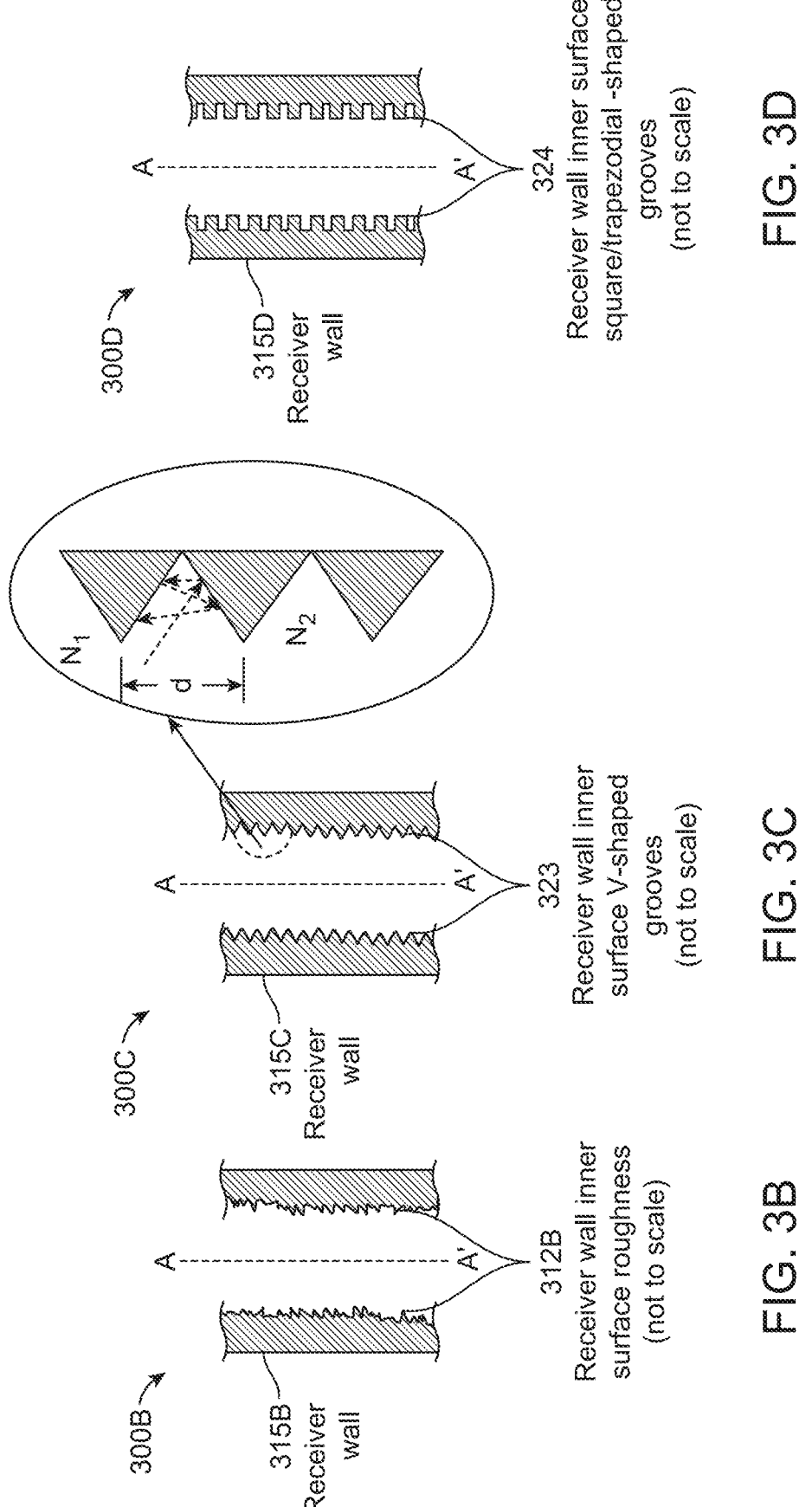
FIGS. 3B-3D show schematic diagrams of concentrated sunlight receiver wall inner surfaces, according to some implementations.
Figure 3E:
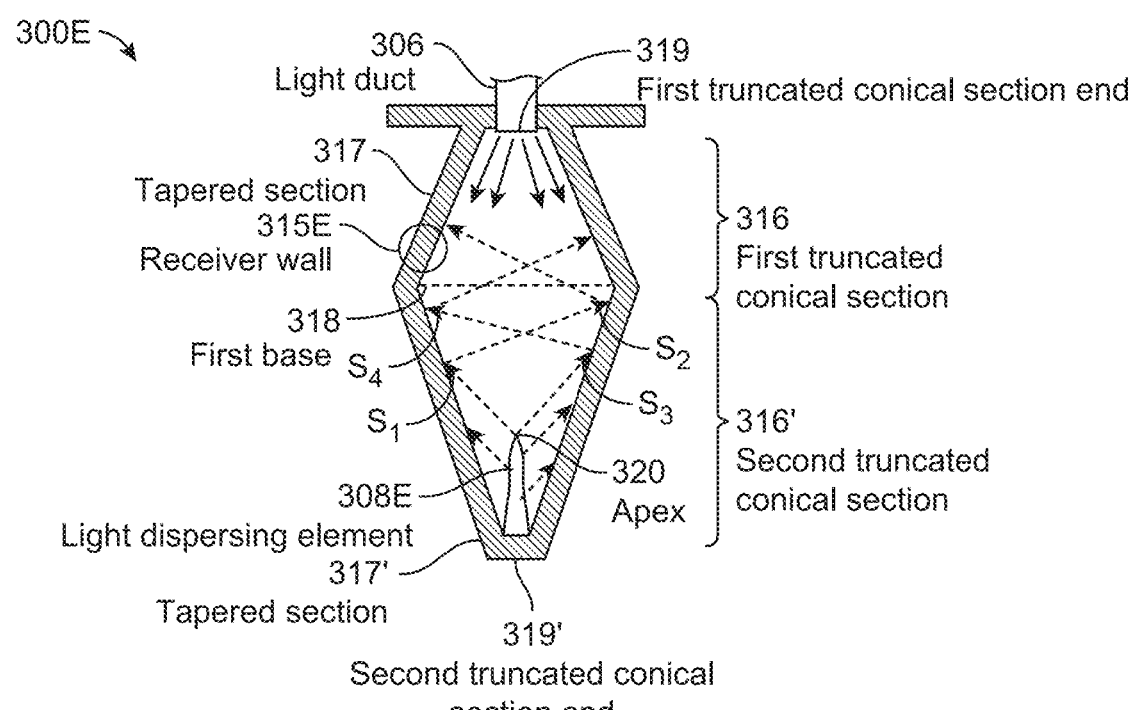
FIG. 3E shows a schematic diagram of another example concentrated sunlight receiver, according to some implementations.
Figure 3F:
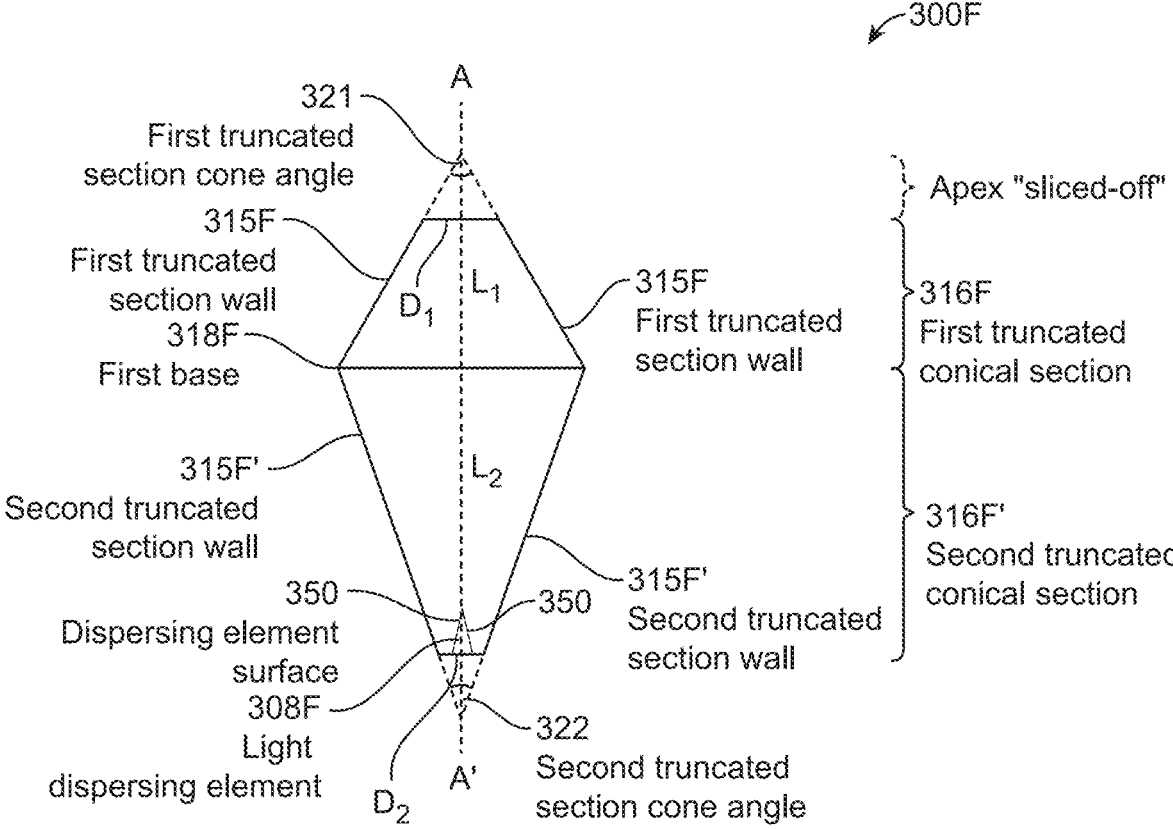
FIG. 3F shows a schematic diagram of a concentrated sunlight receiver, according to some implementations.

FIGS. 3B-3D show schematic diagrams 300B-300D of example concentrated sunlight receiver wall inner surfaces, according to some implementations. In some implementations, as shown in FIG. 3B, the receiver wall 315B inner surface may be roughened to include surface roughness features 312B. In general, the energy in sunlight is distributed across ultraviolet, visible and infrared wavelengths which range from 0.3 μm to 2.5 μm. In some implementations, the surface roughness of the receiver wall 315B inner surface 312B may be characterized by an average roughness ("Ra") of at least 10 μm which, being much greater than the wavelength (k) of incident light, increases absorption of light by the surface 312B. That is, the average height of microscopic peaks and valleys of the surface features may be at least 10 μm. In some implementations, the surface roughness of the receiver wall 315B inner surface 312B may be characterized by an average roughness ("Ra") of between about 12 μm and 14 μm.

Without being bound by any particular theory, the receiver wall inner surface characterized by a surface roughness as described above increases absorption of concentrated sunlight. Un-absorbed light is reflected by the roughness features 312B in all directions via diffuse reflectance causing reflected light to hit other locations of the receiver surface wall, for example, $S_1$ to $S_2$, $S_3$ to $S_4$ and so on, as shown in FIG. 3E by way of illustration. In some implementations, the receiver wall 315B inner surface may be roughened by one or more steps including roughening the surface by wire brushing followed by oxidizing the surface to create one or more rough surface metal oxide layers. As previously described, to increase absorption and emissivity, the receiver wall inner surface may be treated with black paint. In some implementations, the receiver wall inner surface may be black anodized.

In some implementations, the receiver wall inner surface grooves may include a plurality of V-shaped groves 323 (as shown in FIG. 3C), or trapezoidal or square shaped grooves 324 (as shown in FIG. 3D) to increase absorption of concentrated sunlight and to facilitate multiple surface reflections (diffuse reflectance) to increase the absorption of light each time light hits the receiver wall inner surface 311 (as shown in FIG. 3A). In some implementations, the distance "d" between two consecutive grooves $N_1$ and $N_2$ may be significantly greater than the wavelength of sunlight. In some implementations, the distance "d" between two consecutive grooves disposed on receiver wall inner surface 311 may be at least about 250 μm.

FIG. 3E shows a schematic diagram of another example concentrated sunlight receiver 300E, according to some implementations. As previously described, concentrated sunlight may be directly injected into the thermal energy storage inlet 209 (or light duct inlet 209) and into concentrated sunlight receiver 300E using free space optics as illustrated by way of example in FIGS. 7A-7B, 8A-8B, 9A-9B. Alternately, concentrated sunlight may be directed into the thermal energy storage inlet 209 (or light duct inlet 209) using an optical light guide as illustrated by way of example in FIG. 10 and FIG. 12. In contrast to receiver 300A, concentrated sunlight receiver 300E may include an assembly of two conical shaped sections resembling a "lava lamp" in shape. That is, receiver 300E may be characterized by a shape formed by joining first (or upper) truncated conical section 316 and second (or lower) truncated conical section 316' at a first base 318 of each conical section. Each truncated section may resemble a conical frustrum formed by "slicing off" the apex of each conical section. The truncated conical sections include first truncated conical section end 319 and second truncated conical section end 319' disposed at the end of their respective tapered sections 317 and 317', and opposite to first base 318. Light dispersing element 308E may be disposed at lower truncated conical section end 319' and opposite to light duct 306.

Example concentrated sunlight receiver 300E may be configured to decrease energy loss by radiation being emitted back out the light duct 306 from the interior of the receiver. The total radiation energy in receiver 300E is the sum of sunlight entering the receiver that is reflected by interior surfaces (e.g., S1-S4) prior to being absorbed, and the radiation of the interior surfaces as a function of their temperature. The amount of radiation which may be emitted back out the light duct is determined by the inlet's view factor of all of the other interior surfaces of the receiver. For an enclosed volume, the sum of the view factors of all surfaces, with respect to the other surfaces, is equal to 1. The general geometry of receiver 300E decreases the fraction of internal reflected sunlight or thermally emitted radiation impinging on the inlet 310. The receiver inlet's view factor may be minimized by one or more of minimizing the inlet area, angling the surfaces closest to the inlet away from a line normal to the inlet as achieved by the first truncated conical section 316, minimizing the area opposite then inlet as achieved bottom of the second truncated cone 316', or installing a conical dispersing element 308E in the base of the bottom of the second truncated cone such that there is no surface parallel to the inlet. Sunlight reflected or radiation emitted by example surface S1 of the receiver wall 315E, is incident on another surface S2 of the receiver wall 315E. Similarly, any sunlight reflected, or radiation emitted by example surface S3 of the receiver wall 315E, is incident on another surface S4 of the receiver wall 315E. These multiple reflections of sunlight not absorbed by the receiver wall 315E increase absorption of sunlight by the receiver wall 315E and minimize loss of sunlight through the light duct 306 and receiver inlet 310. That is, the example "lava lamp" shaped receiver 300E ensures that the "view factor" of the inlet is minimized.

FIG. 3F shows a schematic diagram of another example concentrated sunlight receiver 300F, according to some implementations. Concentrated sunlight receiver 300F may include a first (or upper) truncated conical section 316F and a second (or lower) truncated conical section 316F' joined at common base (first base) 318F to provide a "lava lamp" shaped receiver. The first truncated conical section 316F, when extrapolated, may be characterized by a first truncated section cone angle 321. Cone angle 321 may be approximately equal to the divergence angle of concentrated sunlight as light enters receiver 300F through light duct 306 (not shown in FIG. 3C for simplicity). The divergence angle, $\Theta$, of light beam may be defined in terms of the diameters, $D_a$ and $D_b$, at two separate positions along the beam, $x_a$ and $x_b$, respectively:

$$\Theta = \arctan\left(\frac{D_b - D_a}{x_{b-x_a}}\right)$$

Similarly, the second truncated conical section 316F', when extrapolated, may be characterized by a second truncated section cone angle 322. Second truncated section cone angle 322 may be smaller than first truncated section cone angle 321 to ensure that concentrated sunlight is reflected by the light dispersing element 308C into the first truncated section wall 315F and second truncated section wall 315F', but not directly out through the light duct 306.

In some implementations or example receiver 300F, the length $L_2$ of the lower truncated conical section 316' may be greater than the length $L_1$ of the first truncated conical section 316. In some implementations or example receiver 300F, the length $L_2$ of the lower truncated conical section 316' may be less than the length $L_1$ of the first truncated conical section 316. Without being bound by any particular theory, increasing the $L_1/D_1$ ratio and/or $L_2/D_2$ ratio may increase the number of reflections of concentrated sunlight not absorbed by wall 315C and 315F' in example receiver 300F, which in turn increases the absorption of concentrated sunlight by receiver 300F, while providing for required heat transfer area for transferring emitted radiated heat from receiver 300F to thermal storage media 203 (as shown in FIG. 2B). $D_1$ and $D_2$ represent the diameter of the ends 319 and 319' (as shown in FIG. 3B) of the upper truncated conical section 316 and lower truncated conical section 316', respectively. In some other implementations, concentrated sunlight receiver 300A may be spherical or conical in shape and may be of any shape that increases absorption of concentrated sunlight.

FIG. 3G shows a schematic cross-sectional view of another example thermal energy storage system 300G, according to some implementations. An example thermal energy storage system 300G for storing thermal energy produced using concentrated sunlight may include a concentrated sunlight receiver 302G disposed in thermal communication or in thermal contact with thermal energy storage media 303G. In some implementations, concentrated sunlight receiver 302G may include a "lava-lamp" shaped receiver 302G, as previously described with reference to FIGS. 3E-3F.

As shown in FIG. 3G, the concentrated sunlight receiver 302G may be immersed or otherwise disposed in direct heat-transfer contact with thermal energy storage media 303G. In some implementations, concentrated sunlight receiver 302G may be embedded within thermal energy storage media 303G. Thermal energy storage system 300G may include a first chamber 301G configured to house both the concentrated sunlight receiver 302G and thermal storage media 303G. In some instances, the receiver 302G outer surface may include a plurality of receiver wall outer surface fins 320G that extend into the thermal energy storage media 303G. Fins 320G may be configured as shown in FIG. 3A. A second chamber 304G may substantially surround or encapsulate the first chamber 301G. An insulation assembly 305G may be disposed in the gap or space between the first chamber 301G and second chamber 304G. The insulation assembly (additional details are provided with reference to FIG. 6) may be configured to minimize overall heat loss from the first chamber 301G by minimizing radiation, convection, and conduction heat transfer to the second chamber 304G.

In some implementations, example insulation assembly 305G may include a first insulation material 305G' sandwiched between the second chamber 304G and a reflective liner 317G. Reflective liner 317G may include one or more of double-aluminized polyester, polished stainless steel, polished aluminum, mirrored glass, or other reflective material, and may reflect radiation emitted from the first chamber 301G back to the surface of the first chamber 301G thereby shielding the second chamber 304G. Additionally, insulation assembly 305G may include an evacuated space or region 318G disposed between the second chamber 304G and the first chamber 301G. Evacuated space or region 318G may be evacuated to less than 1 Torr to minimize convective heat transfer to the second chamber 304G. The insulation assembly may be evacuated using port 312G disposed is fluid communication with a vacuum pump.

Example thermal energy storage system 300G may include a thermal energy storage system inlet 316G. Thermal energy storage inlet 316G may be configured to receive concentrated sunlight from a solar concentrator system, which may be disposed external to the thermal storage system. Inlet 316G may be disposed in light communication or otherwise coupled to receiver 302G via light duct 306G.

In some implementations, concentrated sunlight may be routed to the thermal energy storage inlet 316G using an optical light guide (not shown for convenience). In some other implementations, an example optical light guide may include a fiber optic bundle. In some other implementations, an example optical light guide may include a liquid light guide.

In some instances, thermal energy storage system 300G may be disposed, or otherwise configured, such that inlet 316G faces away from the sun or the sky; that is, inlet 316G may face, or open, or may be pointed towards the ground (or a cement pad, a concrete pad, or any other installation pad or surface). Accordingly, light dispersing element 308G may also face, or be pointed, towards the ground. Without being bound by any particular theory, routing concentrated light through a liquid light guide up the receiver 302G may improve safety associated with capturing concentrated sunlight in thermal energy storage system 300G. In some instances, the thermal energy storage system 300G may be configured to prevent a liquid leaking from the liquid light guide from entering into one or more of the thermal energy storage system 300G or the concentrated sunlight receiver 302G.

In some instances, concentrated sunlight from a solar concentrator (see details with reference to FIG. 10, for example) may be routed into inlet 316G through a liquid light guide (not shown for convenience). Concentrated sunlight may be directed up into receiver 302G and towards light dispersing element 308G. Receiver 302G may be configured to minimize loss of light as previously described with reference to FIGS. 3E-3F. In some implementations, the liquid light guide may include fluorinated ethylene propylene ("FEP") polymer tubing filled with mineral oil. In example thermal energy storage system 300G, a leak from a liquid light guide would not pass into the receiver 320G but would leak into the ground and prevent a fire hazard.

In some implementations, as previously described with references to FIG. 2B, the interior surface of light duct 306G may be coated with highly reflective material or may be polished to a high reflectivity. In some implementations, the thermal energy storage system 300G may include a pressure relief valve 311G to vent any excess pressure in the first chamber 310G and to maintain the pressure in the first chamber at about atmospheric pressure. In some implementations, the materials of construction of the various components associated with thermal energy storage system 300G may be similar to the materials previously described with reference to FIG. 2B.

In some implementations, thermal energy storage system 300G may further include a light duct shutter 314G. The shutter 314G may include a sapphire window 316G and a reflective plate 315G disposed adjacent to and spaced apart from each other. Additional details related to the shutter 314G are provided below with reference to FIGS. 5A-5C.

In some implementation, supports 313G may be made of one or more Macor, alumina, or other high temperature, high strength material and may support first chamber 301G and define the gap 305G (or insulation region 305G) between first chamber 301G and second chamber 304G.

FIG. 4 shows a schematic diagram 400 of a light dispersing element 408, according to some implementations. The dispersing element surfaces 450 extending from the base 440 of the conical shaped light dispersing element 408 to the apex 420 may include a plurality of angled terraces 430 disposed along the surfaces 450. Terraces 430 may reflect light upwards towards the concentrated sunlight receiver walls 415 and disperse light more efficiently towards the concentrated sunlight receiver walls 415.

In some implementations, the one or more surfaces 250 of light dispersing element 208 (as shown in FIG. 2B) or surfaces 350 (as shown in FIG. 3F) or 450 (as shown in FIG. 4) may be characterized by a smooth surface finish. The reflectivity of the light dispersing element may be at least 0.80. The light dispersing element surfaces 250 or 350 or 450 may be characterized by a Roughness Average of less than 0.2 Ra (μm). That is, the one or more surfaces of the light dispersing element may be characterized by a highly polished finish. The example light dispersing element 208 (as shown in FIG. 2B) or 308E (as shown in FIG. 3E) or 308F (as shown in FIG. 3F) may be made of at least one of high temperature stainless steel or superalloy. In some implementations, the light dispersing element may be made of one or more stainless steel (e.g., stainless steel 304, stainless steel 316) or superalloy including Inconel, Hastelloy, or Haynes alloy. Inconel alloys may include the Inconel 625 alloy. Hastelloy may include Hastelloy X. Haynes alloy may include Haynes 230 alloy.

In some implementations, light duct 206 may include an optical window 207 (as shown in FIG. 2A) disposed between thermal energy storage inlet or light duct inlet 209 and the receiver inlet 310. Optical window 207 may be configured to be in an open position or closed position. Window 207 may be in an open position when concentrated sunlight is being captured and transferred into receiver 300 using a solar concentrator system. In some aspects, optical window 207 may be made of sapphire.

FIG. 5A shows a schematic diagram of a partial view of an example concentrated sunlight receiver 500A that includes a light duct plug 560, according to some implementations. Light duct plug 560 may be made of stainless steel, super alloy, or alumina. Plug 560 may include a flange (or cap) 562 and stub 563 and may be configured as a flange plug. Stub 563 may be configured to close light duct 506, for example, during the night, or when the concentrated sunlight receiver is "completely charged" and is held for future use or for transporting to an end-use application. "Completely charged" means that thermal storage media 203 (as shown in FIG. 2B) has reached its capacity to store thermal energy. In some aspects, plug 560 may be press fit into light duct 506 such that flange 562 mates with the second chamber 504 (FIG. 2A-2B provide additional details related to the second chamber). Concentrated sunlight may be directly injected into the thermal energy storage inlet 209 (or light duct inlet 209). Light duct 506 directs concentrated sunlight to the concentrated sunlight receiver inlet 510 disposed in the first truncated conical section end 519A of a "lava lamp" shaped concentrated sunlight receiver. O-rings 572 may be used to provide a seal between plug 560 and the second chamber 504.

In some implementations, a pair of rails with ball bearings may provide the seal between plug 560 and second chamber 504. In some aspects, stub 563 may include threads and may be screwed into light duct 506. In some implementations, plug 560 may be tapered. In some implementations, plug 560 may include a reflective plate 561A disposed on the surface of stub 563 that is opposite to and parallel to the flange 562. When positioned inside inlet 510, reflective plate (or surface) 561A may reflect any unabsorbed light back into the receiver wall 515. In some implementations, reflective plate 561A may be made of polished stainless steel or superalloy. In some implementations, the reflective plate 516A may be made of one or more stainless steel (e.g., stainless steel 304, stainless steel 316) or superalloy including Inconel, Hastelloy, or Haynes alloy. Inconel alloys may include the Inconel 625 alloy. Hastelloy may include Hastelloy X. Haynes alloy may include Haynes 230 alloy.

FIG. 5B shows a schematic diagram of a partial view of an example concentrated sunlight receiver 500B that includes a light duct shutter 570, according to some implementations. The shutter 570 may slide over the light duct inlet 509, for example, during the night to reduce thermal heat losses to the ambient atmosphere. In some implementations, shutter 570 may include a sapphire window 571 and a reflective plate 561B. In some implementations, reflective plate 561B may be made of polished stainless steel or superalloy. As shown in FIG. 5B, shutter 570 is in an "open" position and permits concentrated sunlight to pass through (transmit through) the sapphire window 571 into the concentrated sunlight receiver 500B through inlet 510. Light duct shutter 570 may form a seal with the second chamber 504 using one or more high temperature O-rings 572. Light duct shutter 570 may be configured to be movable in the X-Y direction that is perpendicular to the longitudinal axis (A-A') of concentrated sunlight receiver 500B to position either the sapphire window 571 over the light duct 506 ("open" position) or the reflective plate 561B over the light duct 506. Suitable guide pins (not shown for simplicity) may be employed to position either sapphire window 571 or reflective plate 561B over the light duct 506.

FIG. 5C shows a schematic diagram of a partial view of an example concentrated sunlight receiver 500C that includes a light duct shutter 570, according to some implementations. As can be clearly seen, the reflective plate 561C is positioned over light duct inlet 509 by moving shutter 570 in the X-Y direction. As shown in FIG. 5C, the shutter is in a "closed" position. In some implementations, the shutter movement to "open or closed positions" may be manual or may be automated and may be controlled using a microcontroller disposed to control the operation of the thermal energy storage system disclosed herein.

Figure 6:
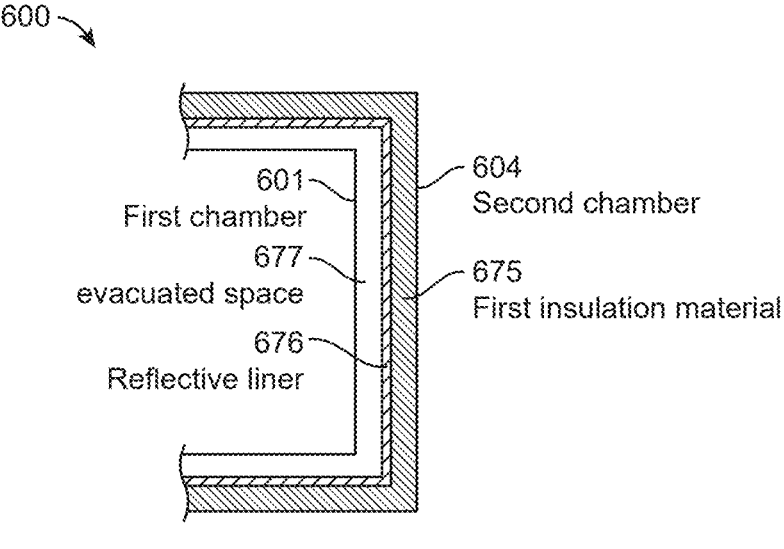
FIG. 6 shows a schematic partial view of an example insulation assembly for a thermal energy storage system, according to some implementations.

FIG. 6 shows a schematic partial view of an example insulation assembly 600 for a thermal energy storage system, according to some implementations. Insulation assembly 600 may be disposed between the first chamber 601 and the second chamber 604. In some implementations, insulation assembly 600 may include a first insulation material 675 sandwiched between the second chamber 604 and a reflective liner 676. Reflective liner 676 may include one or more of double-aluminized polyester, polished stainless steel, polished aluminum, mirrored glass, or other reflective material, and may reflect radiation emitted from the first chamber 201 back to the surface of the first chamber 201 thereby shielding the second chamber 204. Additionally, insulation assembly 600 may include an evacuated space or region 677 disposed between the second chamber 604 and the first chamber 601. Evacuated space or region 677 may be evacuated to less than 1 Torr to minimize convective heat transfer to the second chamber 204. In some implementations, the reflective liner 676 may be in the form of a thin shell configured to hold vacuum in the evacuated space 677. Without being bound by any particular theory, the evacuated gap 205 between first chamber 201 and second chamber 204 may mitigate convection heat loss, the reflective liner may reduce radiation heat loss, and the first insulation material may reduce conduction heat loss. First insulation material 675 may include made of one or more perlite, vermiculite, glass beads, mineral wool, ceramic fiber, fiberglass, aerogel, refractory material including alumina, firebrick, or other insulating material. Support 293 (see FIGS. 2A-2B) may be made of one or more Macor, alumina, or other high temperature, high strength material and may support first chamber 201 and define the gap 205 (or insulation region 205 as shown in FIG. 2A) between first chamber 201 and second chamber 204.

In some implementations, insulation assembly 600 may also include a second insulation material (not shown for simplicity) disposed outside the second chamber 604. In some implementations, insulation assembly 600 may include multiple alternating layers of first insulation material 675 and reflective liner 676.

In some implementations, thermal storage media 203 (as shown in FIG. 2B) may be selected based upon the targeted thermal storage capacity (e.g., kW-h) and temperature ranges. Thermal storage media 203 stores and releases heat during charge/discharge (or heat absorption/heat extraction) cycles by sensible heat, latent heat, or a combination of both. As such, thermal storage media should be able to maintain their physical and chemical properties during a large number of charge/discharge cycles. During sensible heating, thermal storage media undergo temperature increase when heat energy is added without any phase change (e.g., from solid to liquid). That is, solids remain as solids, and liquids remain as liquids during the charge/discharge cycles. If thermal storage media is heated beyond, for example, its melting temperature, it will undergo a phase change during which it remains at a constant temperature and absorbs latent heat of fusion associated with the phase change (e.g., solid to liquid). High specific heat ($C_p$) thermal storage media may absorb more thermal energy for the same magnitude of temperature change than lower specific heat thermal storage media according to:

$$\Delta H = mCp\Delta T,$$

where m is the mass of the thermal storage media. For use in the example thermal energy storage systems disclosed herein, thermal storage media should also be inexpensive, recyclable, and abundantly available. For example, water has a high specific heat (4,190 J/kg/K), but freezes at 0° C. and boils at 100° C. Therefore, the effective temperature range of liquid phase water is only 0° C. to 100° C.

For higher temperature ranges, other thermal storage media that have lower specific heat, but maintain their integrity (physical and chemical properties on cycling) over greater thermal ranges may be used. Examples of such thermal storage media may include one or more of molten salts, silica, magnesia, alumina, zirconia, volcanic rock (basalt), graphite, sand, aluminum, granite, organic oils, or inorganic oils. Phase change thermal storage media or phase change materials ("PCMs") offer improved efficiency because heat may be stored substantially as latent heat at constant temperature and extracted at the point of use. The use of PCMs as thermal storage media may simplify design considerations related to the thermal energy storage system and energy extraction, and energy conversion devices at the point of use. In some implementations, the thermal storage media 203 may include solid materials dispersed in a heat transfer fluid ("HTF"). For example, carbon steel of sizes and shapes (e.g., shaped as ball bearings, particles, or shims) providing the most economical cost may be immersed in high temperature heat transfer fluid capable of heat storage of up to 350° C. The type of storage media may be selected according to the expected maximum and minimum temperatures, targeted size, and heat storage capacity (kJ or kW-h) of the thermal energy storage system.

PCMs may be further classified as organic, inorganic, or eutectic materials. Organic PCMs may include one or more of paraffin waxes, organic esters, fatty acids, alcohols, or glycols. Inorganic PCMs may include salt hydrates that include one or more of magnesium sulfate, cupric sulfate, or gypsum. Inorganic PCMs may also include low melting point metals and metal alloys including one or more of gallium, gallium-gallium antimony, bismuth-cadmium-antimony, or bismuth-lead-antimony. Eutectic PCMs may include a combination of two or more materials including aluminum-silicon (Al—Si) which undergo a eutectic phase transition at 580° C. By varying the compositions of a mixture of the two or more materials, the melting and freezing points of the eutectic mixture can be changed.

In some implementations, thermal energy storage media 203 (as shown in FIG. 2B) may include one or more of aluminum, carbon steel dispersed in aluminum, eutectoid steel dispersed in aluminum, interleaved copper and carbon steel plates, wherein the copper plates may be in thermal contact with the concentrated sunlight receiver 202 (as shown in FIG. 2B), interleaved copper and eutectoid steel plates, wherein the copper plates may be in thermal contact with the concentrated sunlight receiver 202. In some implementations, carbon steel, or eutectoid carbon steel pieces or particles dispersed in molten aluminum, may be used as thermal storage media. The carbon steel components may be of a size or shape that improves economic viability. In some implementations, thermal storage media including eutectoid carbon steel pieces or particles dispersed in molten aluminum may include steel having about 0.8 wt % carbon and may include one or more AISI 1075, AISI 1078, AISI 1080, or AISI 1084. The carbon content in eutectoid steel may range between about 0.75 wt % and about 0.85 wt %.

In some implementations, an example sunlight to thermal energy storage system may include a solar concentrator, and any one of the thermal energy storage systems previously described. One or more microcontrollers may control the operation of the sunlight to thermal energy conversion system. The peak daily energy flux density of sunlight at or below about 40 degrees latitude may be about 800 W/m² to about 1000 W/m². As such, sunlight should be concentrated to enable conversion of sunlight into thermal energy and storage of thermal energy in any of the previously described thermal energy storage systems.

In some implementations, the solar concentrator and the thermal energy storage system may be detachable from each other. In some implementations, the solar concentrator and thermal energy storage system may be mechanically connected using flanges, and the like. In some implementations, a docking assembly may be used to optically align the concentrator with the thermal energy storage system. In some implementations, the solar concentrator for capturing and directing concentrated sunlight into any of the of the thermal energy storage systems previously described, may include one or more of Nasmyth-Coudé solar concentrators, or Cassegrain solar concentrator.

Figure 7A:
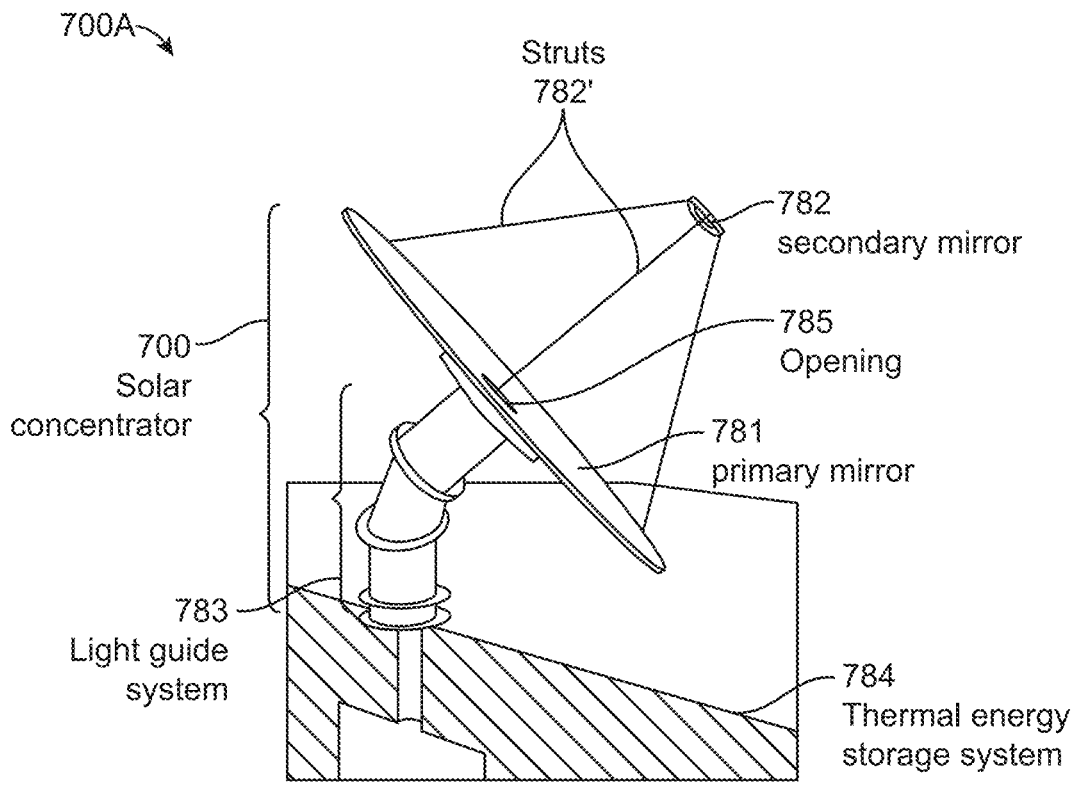
FIGS. 7A-7B show schematic diagrams of a Cassegrain solar concentrator including a light guide system, according to some implementations.
Figure 7B:
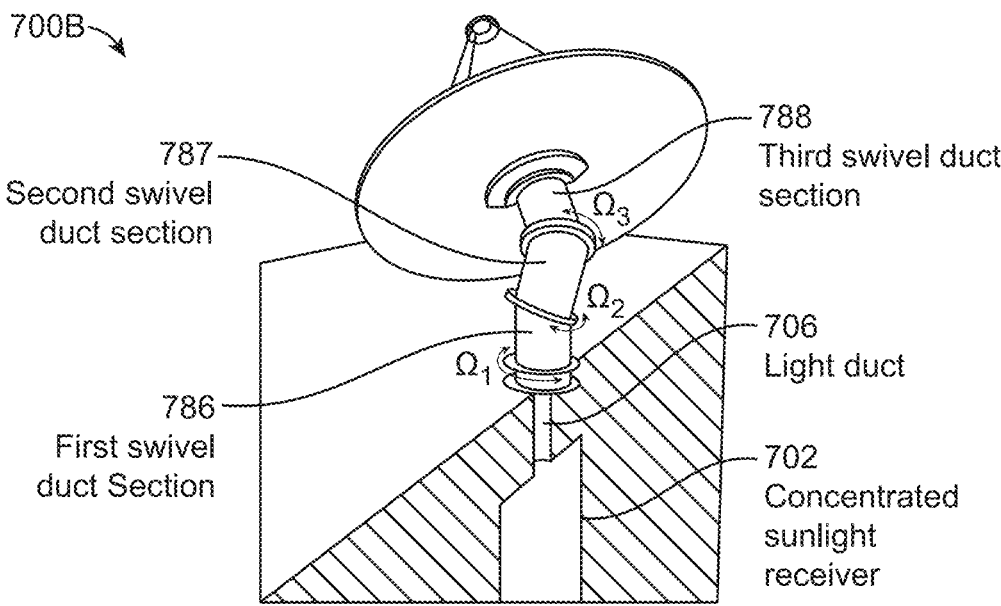

FIGS. 7A-7B show schematic diagrams 700A and 700B of a Cassegrain solar concentrator 700 including a light guide system, according to some implementations. The solar concentrator 700 may include a primary mirror 781, which may be a parabolic concave mirror. Sunlight incident on the primary mirror 781 is reflected up to secondary mirror 782, which may be disposed within the focal length of the primary mirror 781. Secondary mirror 782 may be supported by struts 782'. Secondary mirror 782 may be flat or convex and may reflect sunlight back into an opening 785 at the base of the primary mirror 782 to the focal point of secondary mirror 782, which may be located behind the primary mirror. Alternately, the secondary mirror may produce a collimated beam that passes through the opening 785 in the primary mirror. The primary mirror 781 may be configured to track the sun using a tracking system (not shown for simplicity). A light guide system 783 may be disposed behind the primary mirror 781. Light guide system 783 may be configured to direct focused or collimated sunlight entering through opening 785 into concentrated sunlight receiver 702 through light duct 706 of thermal energy storage system 784 without using fiber optic bundles.

In some implementations, light guide system 783 may include three or more swivel light duct sections 786-788. The first swivel light duct section 786, second swivel light duct section 787, and the third swivel light duct section 788 may be joined to adjoining sections using swivel bearings to independently orient each section at different angles with respect to the center line (shown as longitudinal axis A-A' in FIG. 3A) of light duct 806 of the concentrated sunlight receiver 702. A suitable sun tracking system (not shown for simplicity) may independently move and orient the one or more swivel light duct sections. The operation of the sun tracking system may be controlled using the one or more microcontrollers. Each section may be oriented at different angles ($\Omega_1$, $\Omega_2$, $\Omega_3$, as shown in FIG. 7B) relative to the longitudinal axis of each section. In some implementations, the sun tracking system may include a motor configured to drive a pinion gear attached to one section and configured to turn spur gear rings attached to the adjacent sections to facilitate rotational motion of each swivel light duct section. As such, the swivel light duct sections direct concentrated sunlight from the solar concentrator directly to the concentrated sunlight receiver through an inlet of the receiver, without requiring any fiber optic bundles. In some implementations, the one or more swivel light duct sections may include reflective interior surfaces. In some implementations, the interior surface of each swivel light duct section may be coated with gold or silver or any other reflective material. In the above example implementations, concentrated sunlight receiver 702 is stationary and is not movable to align the receiver with the solar concentrator.

In some implementations, the concentration ratio of the example solar concentrators described above may be at least 2000:1. In some implementations, the concentration ratio of example solar concentrators described above may be between about 3000:1 to 6000:1. The concentration ratio may be defined as the ratio of the area of the primary mirror 781 to the area of the spot size of light passing through opening 785 at the focal point of the mirror system including the primary mirror 781 and secondary mirror 782. The focal point may be located behind the primary mirror 781. In some implementations the secondary mirror may produce a collimated beam of a certain concentrated diameter. For example, primary mirror 781 with a diameter of 1.0 m may have a cross sectional area of 0.785 m². If the spot size of concentrated sunlight is about 2 cm², the concentration ratio is about 2500.

In some implementations, the primary mirror 781 and secondary mirror 782 may be coated to reduce diffuse reflectivity and losses to less than about 5%; that is, high specular reflective surfaces may be achieved using surface coated mirrors. For example, mirrors including aluminum surfaces may be coated with silver or silicon monoxide.

Figure 8A:
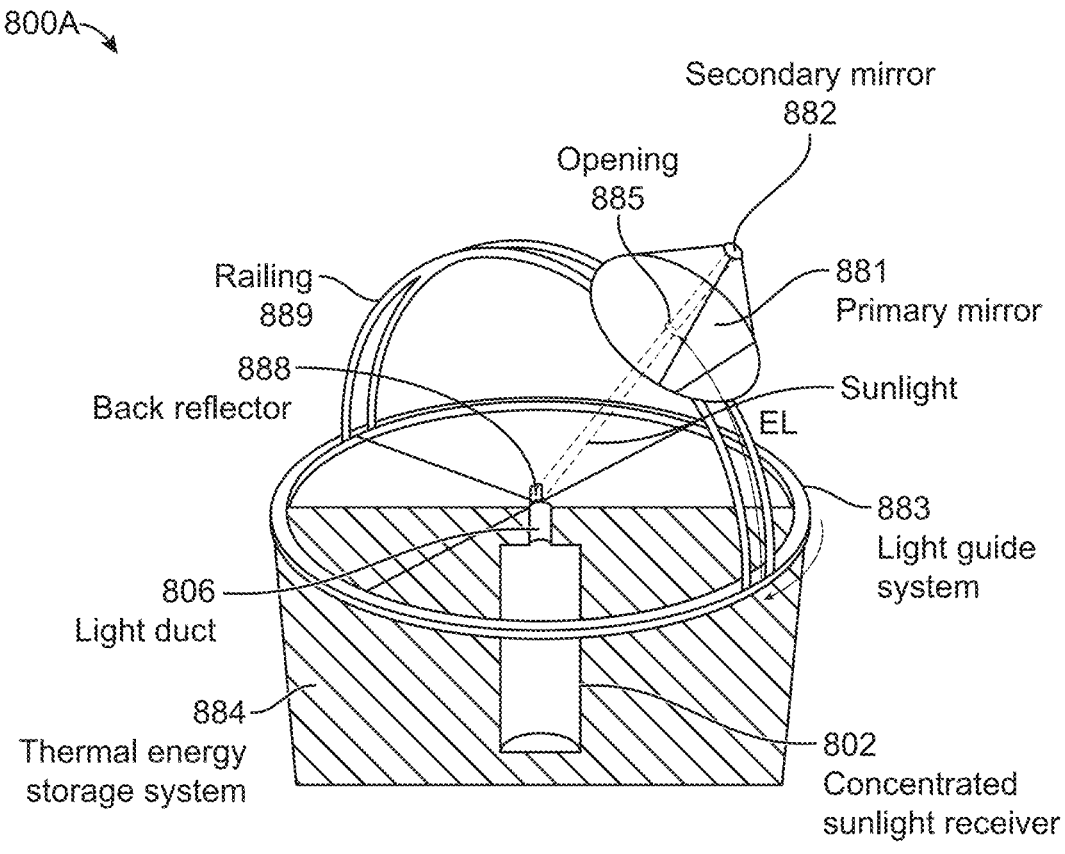
FIG. 8A shows a schematic diagram of a Cassegrain solar concentrator, according to some implementations.

FIG. 8A shows schematic diagrams of a Cassegrain solar concentrator 800A, according to some implementations.

Concentrated sunlight is directly injected into any one of the previously described thermal energy storage systems. Additionally, solar concentrator 800A may not include any duct sections or ducts to guide sunlight into the concentrated sunlight receiver 802. The solar concentrator 800A may include a primary mirror 881, which may be a parabolic concave mirror. Sunlight incident on primary mirror 881 is reflected up to secondary flat or convex mirror 882, which may be disposed within the focal length of the primary mirror 881. Secondary mirror 882 may reflect sunlight back into an opening 885 at the base of the primary mirror 882 to the focal point of secondary mirror 882, which may be located behind the primary mirror, or the secondary mirror may create a collimated beam that passes through the opening 885 in the primary mirror. Concentrated sunlight is directly injected into light duct 806 of thermal energy storage system 884 and directed into the concentrated sunlight receiver 802. The primary mirror 881 may be mounted to light guide system 883, which may include an Az-El mount. The Az-El mount may be coupled to a microcontroller. Elevation ("El") or apparent height is the angle (between 0° and 90°) between an object and an observer's local horizon. Azimuth ("Az") is the angle of an object around the horizon. Light guide system 883 may include a highly reflective back reflector 888 (e.g., with reflectivity of about 95%) attached to railing 889 of the light guide system 883. Reflector 888 may be used to increase the acceptance angle to light duct 806. The acceptance angle may be defined as the maximum angle that will allow for light to enter the receiver. Light guide system 883 may include motorized drive wheels that run along curved rail tracks (not shown for simplicity).

Figure 8B:
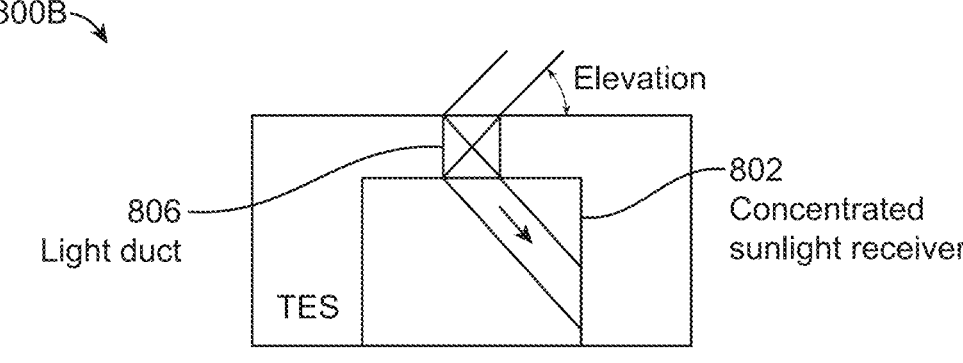
FIG. 8B shows a schematic diagram of a solar concentrator that illustrates direct light injection into a thermal energy storage system, according to some implementations.

FIG. 8B shows a schematic diagram 800B of a solar concentrator that illustrates direct light injection into a thermal energy storage system, according to some implementations. Concentrated sunlight passing through opening 885 in the primary mirror 881 must be directed through a narrow light duct 806 and into concentrated sunlight receiver 802. Light duct 806 may be coated with a highly reflective material including one or more of gold, silver, aluminum, or other reflective material to urge concentrated sunlight to undergo several reflections as it traverses the length of duct 806 into the receiver 802. FIG. 8B shows only one such reflection, for the sake of illustration. In some implementations, the entirety of the concentrated sunlight passing through opening 805 is admitted to into light duct 806 and after undergoing one or more reflections, into receiver 802 to minimize losses and resultant heating of the second or outer chamber (shown in FIG. 2A) of the thermal energy storage system 884.

Figure 9A:
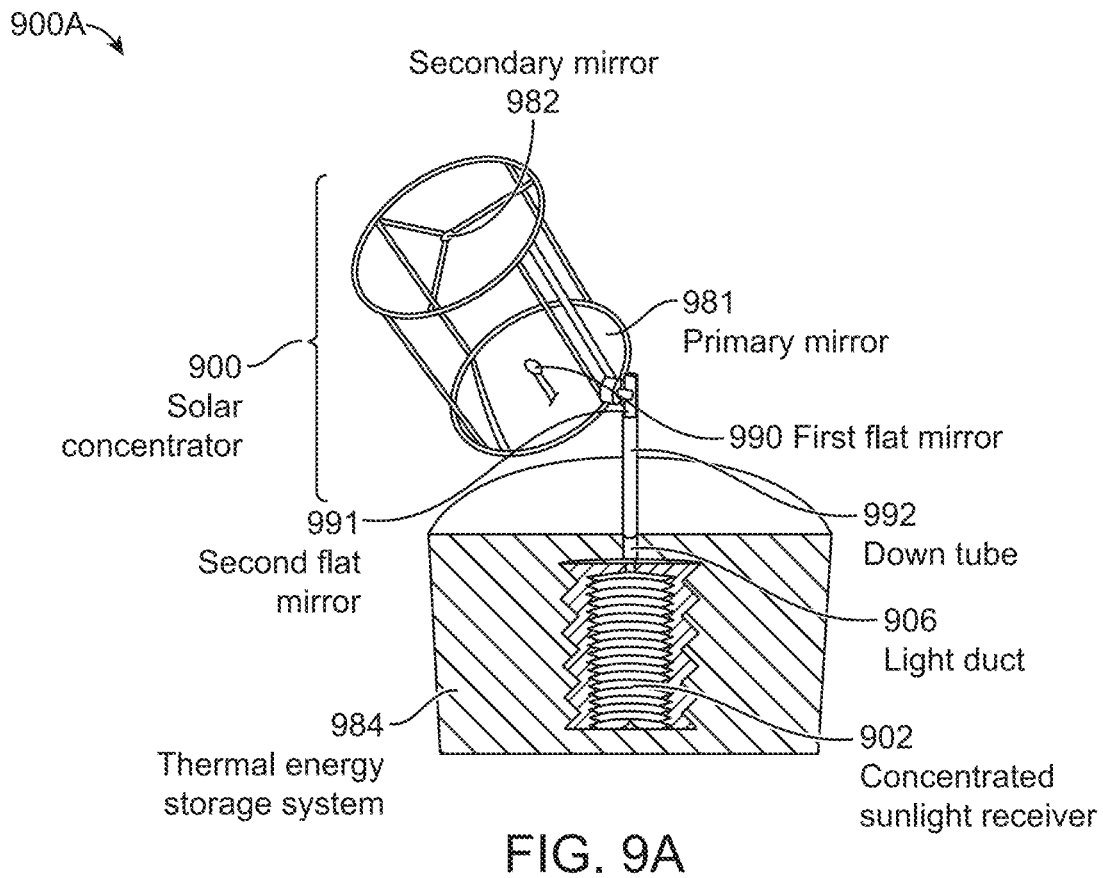
FIG. 9A shows a schematic diagram of a Nasmyth-Coudé solar concentrator, according to some implementations.

FIG. 9A shows a schematic diagram 900A of a Nasmyth-Coudé solar concentrator 900, according to some implementations. Concentrated sunlight is directly injected into any one of the previously described thermal energy storage systems. The solar concentrator 900 may include a primary mirror 981, which may be a concave parabolic mirror. Sunlight incident on primary mirror 981 is reflected up to secondary mirror 982. Secondary mirror 982 may be a convex mirror located within the focal length of the primary mirror. Secondary mirror 982 may reflect collimated sunlight back toward primary mirror 981. First flat mirror 990 redirects the concentrated beam of sunlight to second flat mirror 991. Second flat mirror is configured to direct concentrated sunlight via a 90 degree turn to down tube 992 and light duct 906, and into concentrated sunlight receiver 902 disposed in thermal energy storage system 984. A Coudé path refers to a path that includes bending of a light path through 90° so that the optical axis of the light path is coincident with a physical rotation axis of the solar concentrator, and consequently does not deviate in angle or position as the solar concentrator rotates about that axis of rotation. Thermal energy storage system 984 may include any one of the thermal energy storage systems previously described herein.

Solar concentrator 900 may include a sun tracking system (not shown for simplicity) that may include an Az-El mount as previously described with respect to FIG. 8A. As the primary mirror 981, secondary mirror 982, and first flat mirror 990 do not move with respect to each other, elevation changes and rotational changes of concentrator 900 may be made without affecting the direction of concentrated sunlight exiting the first flat mirror 990. The inner surfaces of downtube 992 and light duct 906 may be coated with a highly reflective material to increase reflection of light into the concentrated sunlight receiver 902. Concentrated sunlight may be directly injected using free space optics into any one of the previously described thermal energy storage systems.

Figure 9B:
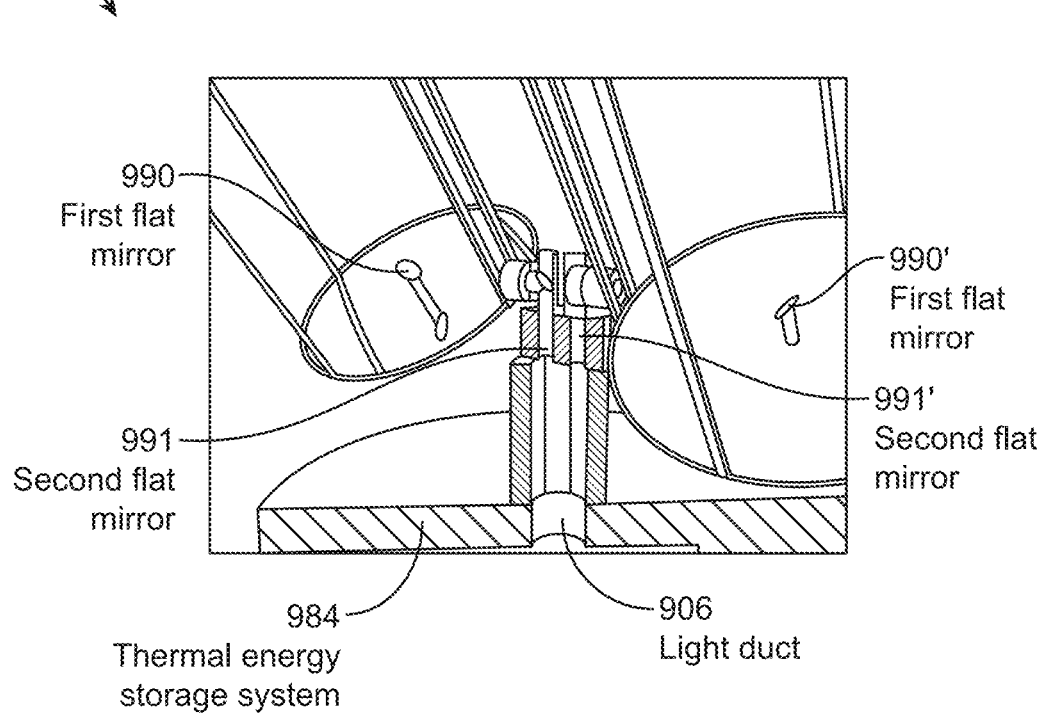
FIG. 9B shows a schematic diagram of dual Nasmyth-Coudé solar concentrator, according to some implementations.

FIG. 9B shows a schematic diagram 900B of dual Nasmyth-Coudé solar concentrator, according to some implementations. In an example dual concentrator system, each solar concentrator includes the features of solar concentrator 900A as previously described. That is the dual concentrator includes two first flat mirrors 990 and 990' and second flat mirrors 991 and 991' (the primary and secondary mirrors are not shown in FIG. 9B for simplicity). Both solar concentrators direct concentrated sunlight into a common thermal energy storage system 984 through light duct 906.

The thermal energy stored in thermal storage media 203 in the example thermal energy storage systems, as previously disclosed, may be extracted for use as heat and/or converted to electricity. In some implementations, thermal energy stored in thermal storage media 203 may be extracted using air, gases, or high temperature heat transfer fluids.

Figure 10:
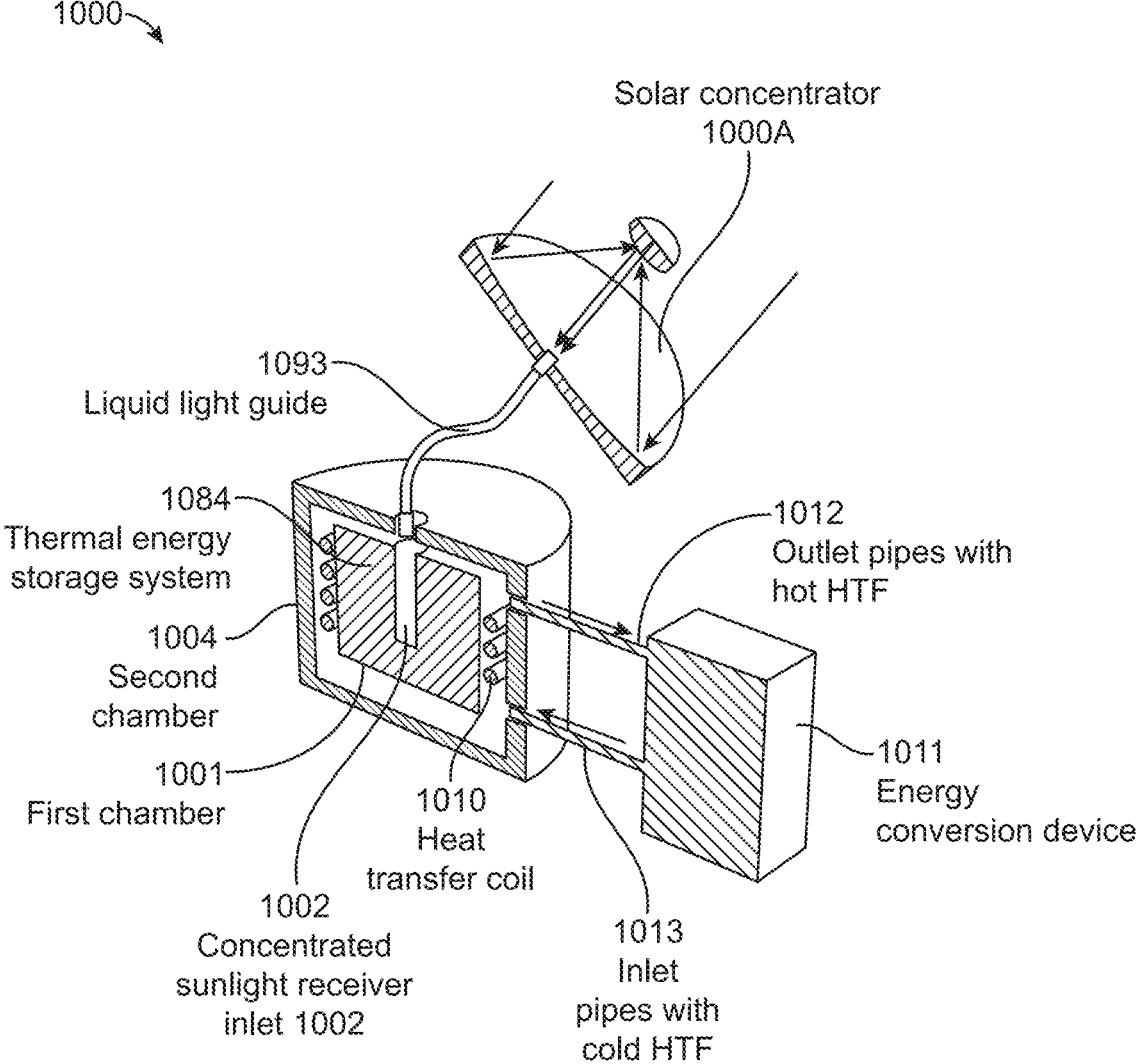
FIG. 10 shows a schematic diagram of a sunlight-to-thermal energy conversion system including a solar concentrator, liquid light tube, thermal energy storage system, and heat extraction means, according to some implementations.

FIG. 10 shows a schematic diagram 1000 of a sunlight-to-thermal energy conversion system including a Cassegrain solar concentrator, a liquid light tube or fiber optic bundle, thermal energy storage system and heat extraction means, according to some implementations. Solar concentrator 1000A may include any one of the solar concentrators previously disclosed herein. Concentrated sunlight may be directed into the thermal energy storage inlet 209 (or light duct inlet 209) using a liquid light guide or fiber optic bundle 1093 with its inlet disposed at the base of the primary mirror or at some point between the primary and secondary mirror. In some implementations, concentrated sunlight may be directly injected (which may also be referred to herein as free space optics) into the thermal energy storage inlet 209 (or light duct inlet 209) with its inlet disposed at the base of the primary mirror or at some point between the primary and secondary mirror. Thermal energy storage system 1084 may include any one of the thermal energy storage systems previously disclosed herein. In some implementations, the heat extraction components may include a heat transfer coil 1010 coiled around the first chamber 1001 through which a high temperature heat transfer fluid ("HTF") is flowed to extract heat from the thermal energy storage system 1084. Hot HTF may flow out of the thermal energy storage system 1084 to an energy conversion device 1011 through outlet pipes 1012. Example energy conversion device 1011 may include a space heater, water heater, industrial process heater, any endothermic reactor (which requires heat for the reaction to proceed), desalinization, or a heat engine such as a steam Rankine cycle or Stirling cycle to produce electricity on demand. After losing its heat in the end device, HTF may be returned to the thermal energy storage system 1084 via inlet pipes 1013. The cycle may be repeated continuously while extracting heat from the thermal energy storage system.

In some implementations the cycling of HTF through heat transfer coil 1010, and inlet piping 1013, outlet piping 1012, and end device 1011 may require a mechanical pump. The heat extraction process may be controlled using one or more microcontrollers which may monitor the temperature of the thermal storage media, the temperature of the HTF in inlet pipes 1012, the temperature of the HTF in outlet pipes 1013 using thermocouples or other temperature sensors. In some implementations, the thermal storage media 203 in first chamber 1011 may include solid materials dispersed in a heat transfer fluid ("HTF"). In such implementations, the HTF may be circulated directly from, and back to, the first chamber rather than using transfer coil 1010.

In some implementations, thermal energy may be extracted using a heat pipe or thermosyphon systems and methods. A heat pipe is a heat-transfer device that employs phase transition of a specially selected working fluid inside an enclosed tube to transfer heat between two solid interfaces at a predetermined temperature. Thermosiphon (or thermosyphon) is a passive heat exchange method, which circulates a fluid without a mechanical pump using natural convection principles. In some implementations, the heat extraction components may include a storage vessel for HTF, which separates out cold and hot HTF by natural convection (for example, denser cold HTF may segregate at the bottom of the storage vessel and hot HTF at the top, with HTF subject to a temperature gradient disposed in between the cold and hot fluids). Management of pressure drop through the pipes would be required to ensure that desired HTF flow through the pipes.

In some implementations, a high temperature heat transfer fluid ("HTF") may be flowed through a heat transfer coil 1010 disposed inside the thermal storage media 203. The thermal energy storage media does not directly contact the HTF as heat is conducted through the walls of coil 1010 into the HTF as it passes through the first chamber 201.

In some implementations, when the thermal storage media is in solid form, a gaseous HTF may be directly flowed through solid thermal storage media housed in first chamber 1001. The thermal storage media may include one or more of alumina pebbles, rocks, clay brick pieces, or metal fragments. Air or some other desired industrial process gas may be used as the heat transfer fluid. Air may flow into the first chamber 1001, distribute through the thermal storage media, picks up heat from the thermal storage media, and then exits first chamber 1001. Heated air may then flow to the energy conversion device (or end-use device) 1011. Warm air may then be recycled or vented to the atmosphere.

In some implementations, the first chamber 1001 may include an outer jacket (not shown for simplicity) disposed between the insulation assembly and the first chamber. A suitable heat transfer fluid may flow through the jacket to remove heat from the thermal storage media for use in an energy conversion device (or end-use device) 1011.

In some implementations, end-uses for heat stored in the example thermal energy storage systems may include direct heating, for example, space heating, water heating, or industrial process heat, including one or more of distillation, chemical processing, or sterilization in food processing. An end-use device may include a heat engine that may be used to convert heat to electricity. An example electricity generating system may include a Stirling cycle engine coupled with an electric generator. Alternately, heat from thermal energy storage systems may be used to generate steam which may then be expanded through a turbine connected to an electrical generator as in a Rankin cycle.

In some implementations, an example thermal storage media may radiate at specific wavelengths when heated, which may then be used to illuminate photovoltaic cells designed for that wavelength to directly produce electricity. In some implementations, a thermoelectric system (based on the Seebeck effect) may be used to directly produce electricity from a temperature differential established across dissimilar metals or between p-type and n-type semiconductor materials. Heat that might otherwise be lost to the ambient atmosphere may be used to heat the hot side of a thermoelectric device and a heat sink such as a ground loop may function as the cold junction. A ground loop includes a series of pipes buried underground at a depth where temperatures stay consistent throughout the year. An example thermoelectric system may be combined with any of the previously described energy conversion devices or end devices to augment energy production.

In some implementations, thermal energy extracted from any one of the thermal energy storage systems described herein may be used to produce hydrogen via endothermic steam reforming of fuels including natural gas. In some implementations, the extracted thermal energy may be used to produce fresh water from sea water through a multi-stage flash distillation process.

The example sunlight to thermal energy conversion systems described herein may be modular and easily scalable in terms of thermal energy capacity (e.g., kW-h) by increasing its primary mirror size and/or producing multiple units of an optimized size and scale which cumulatively provide the desired capacity. In some implementations, a sunlight to thermal energy conversion system may include a solar concentrator, thermal energy storage system, and heat extraction means. A sunlight to thermal energy conversion system may include a solar concentrator, thermal energy storage system, and connections including flanges, valves and the like, to provide heat extraction. Any one of the heat extraction components and processes previously described may be used. An example solar concentrator may include any one of the solar concentrators previously disclosed herein. An example thermal energy storage system may include any one of the thermal energy storage systems previously disclosed herein.

Figure 11:
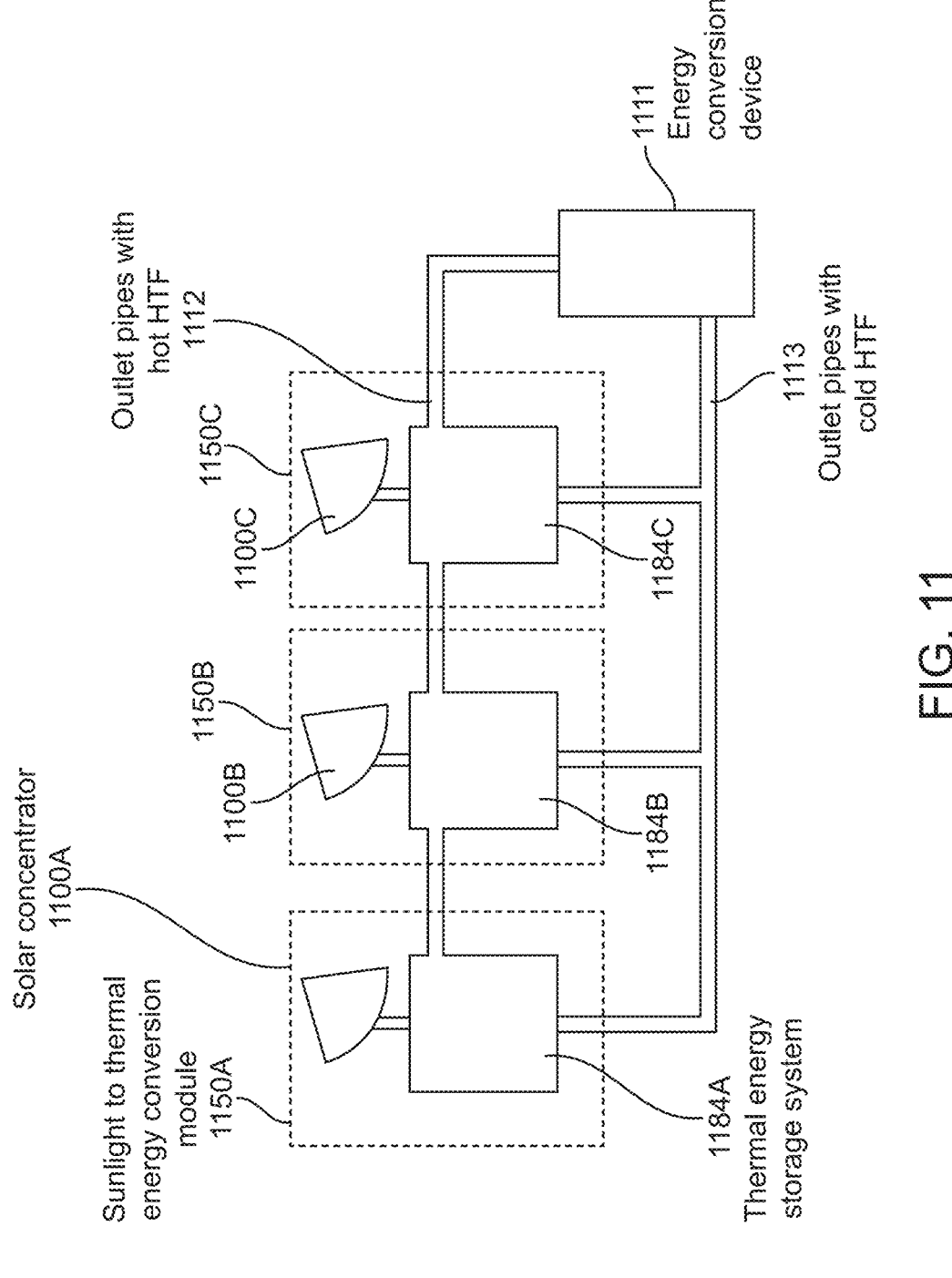
FIG. 11 shows a schematic diagram illustrating sunlight to thermal energy conversion system including modules connected in series, according to some implementations.

FIG. 11 shows a schematic diagram illustrating an example sunlight to thermal energy conversion system 1100 including modules connected in series, according to some implementations. Concentrated sunlight may be directly injected into the thermal energy storage inlet 209 (or light duct inlet 209) without requiring fiber optic bundles. Example modules 1150A-1150C may each include a solar concentrator 1100A-1100C and thermal energy storage system 1184A-1184C. Thermal extraction means may include using high temperature heat transfer fluid ("HTF") that extracts heat with hot HTF flowing through outlet pipes 1112 to an energy conversion device or end-use device 1111 and cold HTF returning via outlet pipes 1113 to each module. Each module may be isolated using from system 1100 using suitable valve arrangements (not shown for simplicity). The operation of modules in system 1100 may be controlled using one or more microcontrollers (not shown for simplicity). Any number of modules may be connected to series to scale-up energy (e.g., kW-h) output. In some implementations, modules may be connected in parallel to increase the duration of supplying a predetermined energy output.

Figure 12:
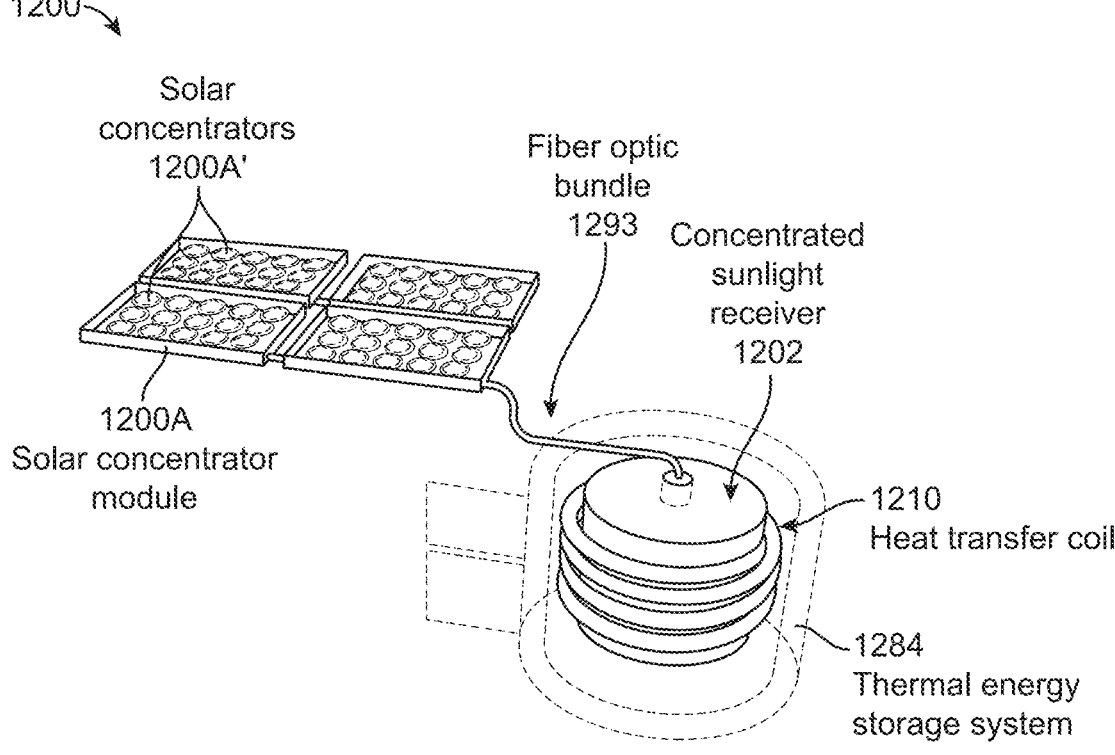
FIG. 12 shows a schematic diagram illustrating an example sunlight to thermal energy conversion system including a plurality of solar concentrator modules, according to some implementations.

FIG. 12 shows a schematic diagram illustrating an example sunlight-to-thermal energy conversion system 1200 including a plurality of solar concentrator modules, according to some implementations. System 1200 may include a plurality of solar concentrators 1200A' arranged in modules 1200A. For illustration purposes, system 1200 includes four solar concentrator modules 1200A, with each module including 15 solar concentrators 1200A'. Solar concentrator 1200A' may include parabolic dish solar concentrators. Concentrated sunlight may be directed to concentrated sunlight receiver 1202 disposed in thermal energy storage system 1284 via fiber optic bundle 1293. HTF flowing through heat transfer coil 1201 may be used to extract heat from thermal energy storage system, 1284 (thermal storage media and other details not shown for simplicity).

In some implementations, the individual solar concentrators may be fixed (are not movable), but each module 1200A may be disposed on an azimuth-elevation ("Az-El") mount that may be coupled to a sun tracking system and a microcontroller. An example Az-El mount was previously described with respect to FIG. 8A. In some implementations, larger solar concentrators may be mounted individually on an Az-El tracking mount. Example system 1200 may be mounted on a roof, tower, or on the ground.

In some implementations, a sunlight to thermal energy conversion system may include a solar concentrator, and any of the previously described thermal energy storage systems. The solar concentrator and the thermal energy storage system may be configured to be detachable from each other. One or more microcontrollers may be used to control the operation of the sunlight to thermal energy conversion system. In contrast to direct injection of concentrated sunlight into the thermal storage system, a liquid light guide may be used to transfer concentrated sunlight from the solar concentrator to the thermal storage system. The liquid light guide may include fluorinated ethylene propylene (FEP) polymer tubing filled with mineral oil. In some implementations, a fiber optic bundle may be used to transfer concentrated sunlight from the solar concentrator to the thermal storage system.

Figure 14A:
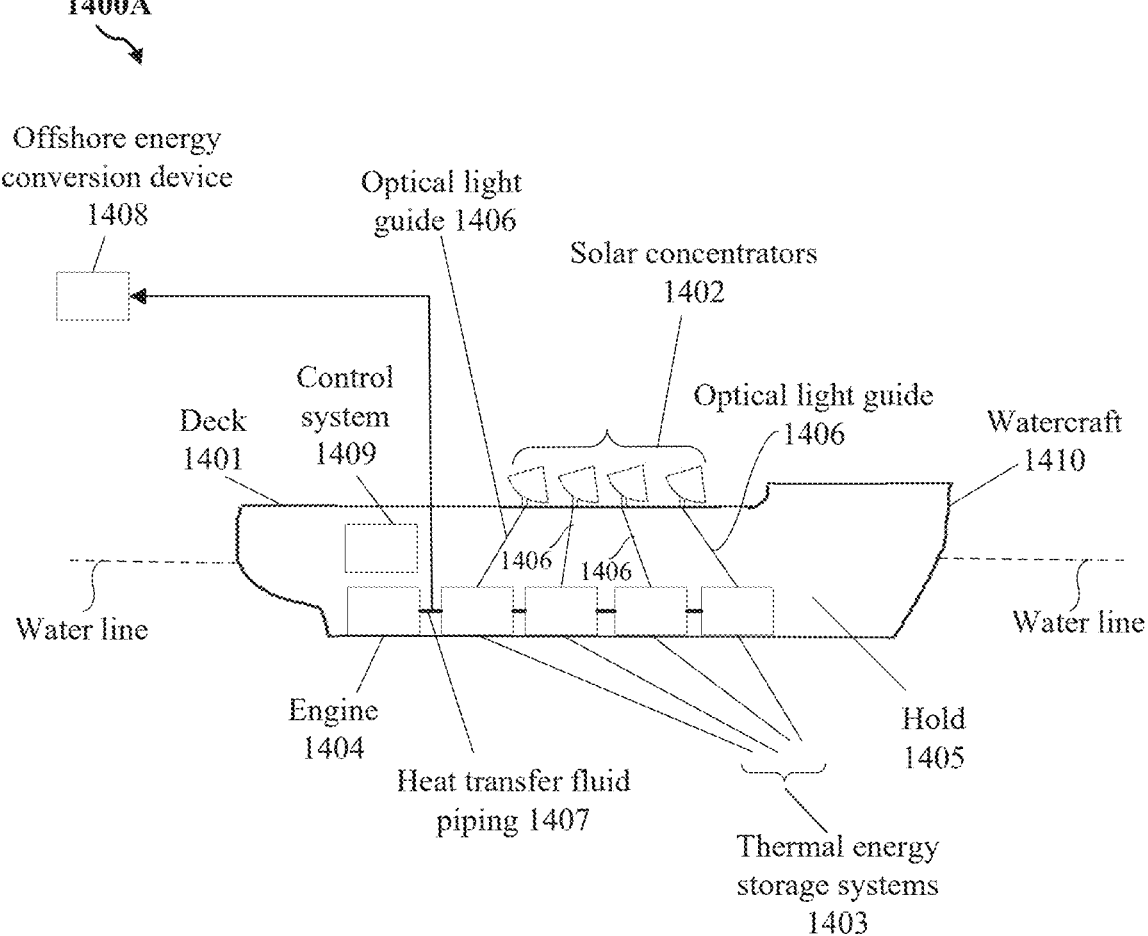
FIG. 14A shows a schematic diagram of an offshore solar energy harvesting and storage system, according to some implementations.

FIG. 14A shows a schematic diagram of an offshore solar energy harvesting and storage system 1400A, according to some implementations. In some implementations, offshore solar energy harvesting and storage system 1400A may be disposed on a watercraft 1410. Example watercrafts may include one or more of a ship, a barge, a boat, a vessel, a yacht, or a floatable platform that can be towed to shore or a port. In some instances, an example a sunlight to thermal energy conversion system may include one or more thermal energy storage systems 1403 disposed in thermal communication with one or more solar concentrators 1402 using one or more optical light guides 1406. In some implementations, the one more solar concentrators 1402 may be disposed on a deck 1401 or watercraft 1410.

In some implementations, an example sunlight to thermal energy conversion system may include any one of the thermal energy storage systems previously described herein, for storing thermal energy produced from concentrated sunlight. In some instances, as previously described herein referring to FIGS. 2A, 2B, and 3G, each thermal energy storage system may include one or more concentrated sunlight receivers (not shown in FIG. 14A for simplicity) disposed in thermal contact with thermal energy storage media, a first chamber configured to house the one or more concentrated sunlight receivers and the thermal energy storage media (not shown in FIG. 14A for simplicity), a second chamber substantially encapsulating the first chamber and separated from the first chamber by an insulation assembly (not shown in FIG. 14A for simplicity), and a light duct 1406 disposed between a thermal energy storage system inlet and an inlet associated with each of the respective one or more concentrated sunlight receivers. Accordingly, concentrated sunlight from each of the one or more solar concentrators 1402 may be transferred to the one or more thermal energy storage systems 1403 using one or more optical light guides 1406. In some instances, each of the one or more thermal energy storage systems 1403 may be disposed below the deck 1401 of the watercraft 1410. For example, each of the one or more thermal energy storage systems 1403 may be disposed in a hold area 1405 associated with watercraft 1410.

In some implementations, example offshore solar energy harvesting and storage system 1400A may further include a control system 1409. Example control system 1409 may include a sun tracking system (not shown for simplicity) and a controller configured to perform one or more of optimizing solar energy harvesting and storage by moving each of the one or more solar concentrators 1402 using the sun tracking system or initiating the movement of the watercraft 1410 offshore to one or more predetermined latitude and longitude coordinates for harvesting solar energy and maintaining the orientation of the watercraft to the sun. As such, the movement of each of the solar concentrators or the need to adjust the orientation of each of the solar concentrators with respect to the position of the sun may be minimized irrespective of wind or waves that may alter the positioning of the watercraft.

In some implementations, solar concentrators 1402 may include one or more of Nasmyth-Coudé solar concentrators, parabolic dish solar concentrators, or Cassegrain solar concentrators. Details related to these examples solar concentrators were previously described herein. In some instances, each of the one or more solar concentrators may be disposed on an azimuth-elevation (Az-El) mount coupled to the sun tracking system.

In some implementations, the one or more optical light guides 1406 may include one or more liquid light guides. In some instances, each liquid light guide may be configured to transfer concentrated sunlight from the each of the respective one or more solar concentrators 1402 to a corresponding thermal energy storage system 1403 in the one or more thermal energy storage systems. In some instances, the one or more liquid light guides 1406 may be manifolded (not shown in FIG. 14A for simplicity) and then coupled with each of the one or more thermal energy storage systems 1403. In some instances, the one or more liquid light guides may include fluorinated ethylene propylene (FEP) polymer tubing filled with mineral oil. In some other instances, as previously described with reference to FIG. 3G, each of one or more the thermal energy storage systems may be configured to prevent a liquid leaking from the respective liquid light guide from entering into one or more of the thermal energy storage system or into the one or more concentrated sunlight receivers associated with the respective thermal energy storage system.

In some implementations, the one or more optical light guides 1406 may include one or more fiber optic bundles, each fiber optic bundle configured to transfer concentrated sunlight from each of the respective one or more solar concentrators to a corresponding thermal energy storage system.

In some implementations, each of the one or more concentrated sunlight receivers disposed in the one or more thermal energy storage systems 1403 may include a receiver wall inner surface and a receiver wall outer surface. The receiver wall inner surface may be characterized by a surface roughness Ra of at least 10 μm. In some instances, the receiver wall inner surface may include a plurality of inner surface grooves extending into the receiver wall. In some other instances, each of the one or more concentrated sunlight receivers may include a receiver wall inner surface and a receiver wall outer surface, wherein the receiver wall inner surface may be black anodized or painted black.

In some implementations, each of the one or more concentrated sunlight receivers is in the shape of a lava lamp (referring to FIGS. 3E-3G) characterized by first truncated conical section and second truncated conical section joined at a common base. In some implementations, each of the one or more concentrated sunlight receivers may be cylindrical, spherical, or conical in shape. In some instances, each thermal energy storage system 1403 may further include a light duct shutter. A light duct shutter may include a sapphire window disposed adjacent to and spaced apart from a reflective plate.

In some implementations, each of the one or more concentrated sunlight receivers may further include a light dispersing element (referring to FIGS. 2A, 2B, and 3G) disposed opposite to an inlet of each of the respective concentrated sunlight receivers and configured to disperse concentrated sunlight towards one or more walls of each of the respective concentrated sunlight receivers. In some instances, an example light dispersing element may be characterized by a reflectivity of at least 0.80. In some instances, an example light dispersing element may be conical in shape.

In some implementations, each of the one or more concentrated sunlight receivers in thermal energy storage systems 1403 may further includes fins (referring to FIG. 3A) extending into the thermal energy storage media. In some other implementations, the insulation assembly in each of the thermal energy storage systems 1403 may include one or more of an insulation material disposed between the first chamber and the second chamber, a reflective liner, and an evacuated space disposed between the first chamber and the second chamber.

In some implementations, example thermal energy storage media in thermal energy storage system 1403 may include one or more of aluminum, carbon steel dispersed in aluminum, eutectoid steel dispersed in aluminum, interleaved copper and carbon steel plates, wherein the copper plates are in thermal contact with the concentrated sunlight receiver, interleaved copper and eutectoid steel plates, wherein the copper plates are in thermal contact with the concentrated sunlight receiver, heat transfer fluid capable of heat storage of up to 350° C., carbon steel immersed in high temperature heat transfer fluid capable of heat storage of up to 350° C. In some instances, eutectoid steel may include carbon steel having about 0.8% carbon.

In some implementations, thermal energy stored in thermal energy storage systems 1403 may be extracted using heat extraction means as previously described herein. Example heat extraction means may disposed in thermal communication with the thermal energy storage media in each of the thermal energy storage systems 1403. In some instances, example heat extraction means may include one or more of a heat transfer coil piping 1407 disposed in contact with the first chamber and between the first chamber and the second chamber of each of the thermal energy storage systems 1403, or disposed within the first chamber, wherein a heat transfer fluid is passed thorough the coil piping to remove heat from the thermal storage media to an energy conversion device 1408 located onshore when the watercraft is moved to a port or other suitable docking area. In some other instances, example heat extraction means may include circulating heat transfer fluid through the first chamber, wherein the heat transfer fluid removes heat from the thermal storage media to an energy conversion device located 1408 onshore. In some other instances, example heat extraction means may include one or more of a heat pipe or thermosyphon system, wherein heat is transferred from the thermal energy storage media to an energy conversion device 1408 located onshore.

Figure 14B:
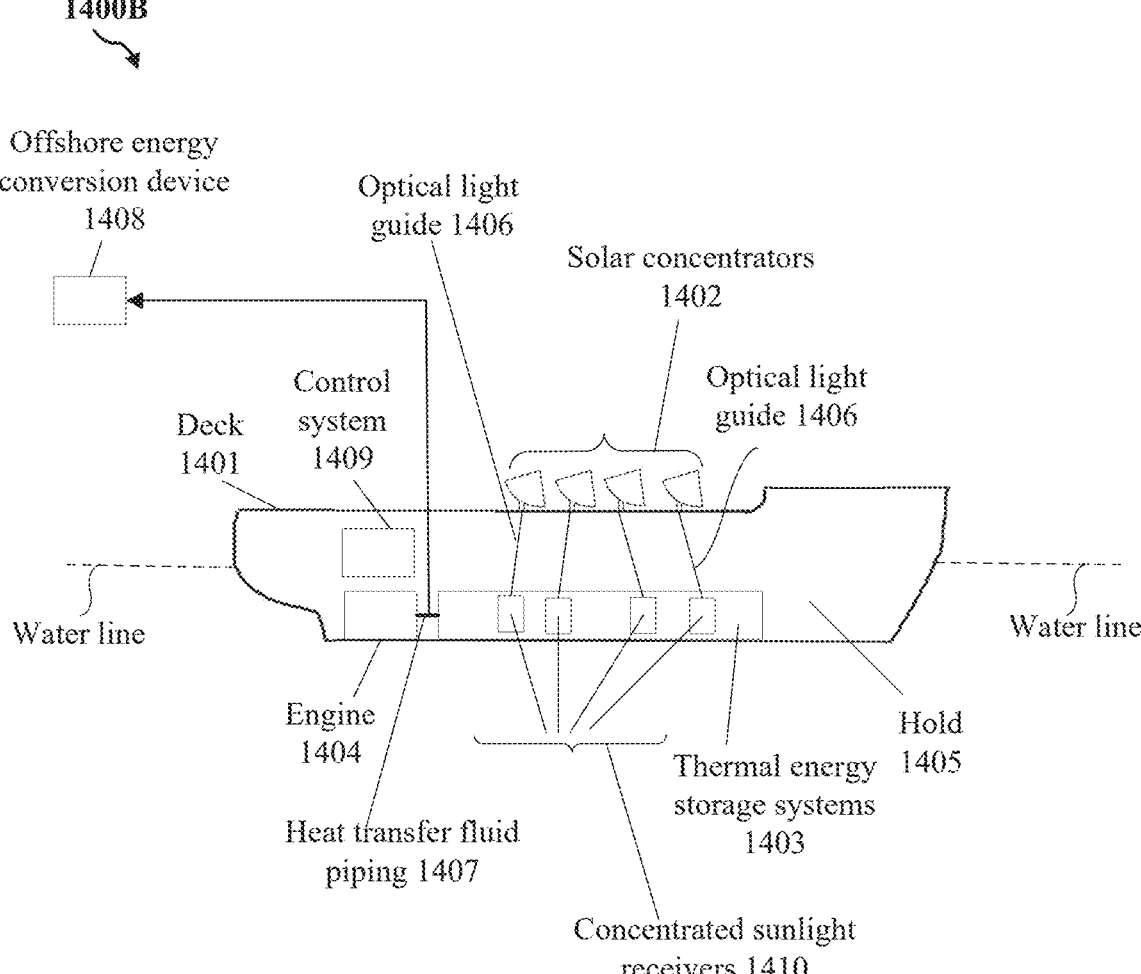
FIG. 14B shows a schematic diagram of another offshore solar energy harvesting and storage system, according to some implementations.

FIG. 14B shows a schematic diagram of another offshore solar energy harvesting and storage system 1400B, according to some implementations. In some implementations, offshore solar energy harvesting and storage system 1400B may include one or more thermal energy storage systems 1403. Each thermal energy storage system 1403 may include more than concentrated sunlight receiver 1410. Other features with respect to the offshore solar energy harvesting and storage system 1400B were previously described herein with reference to FIG. 14A.

In some implementations, the example offshore solar energy harvesting and storage system 1400A or 1400B may be used to provide concentrated solar thermal energy to islands and coastal regions for generating electricity. Islands including Hawaii, Caribbean islands, and Mediterranean islands have very high cost of electricity and have limitations on land use due to the high cost and availability of land, environmental concerns, and impact to scenery or tourism. Use of wind turbines and/or photovoltaic solar arrays are unsightly, require large swaths of land and are often opposed by local residents and businesses. Coastal regions tend to have large and growing populations. Expanding or siting new power stations can be challenging due to the same reasons cited for islands. A small fleet of watercraft 1410 may be sued to continuously supply heat for power by rotating between port and offshore sea collection. Additionally, watercraft 1410 may be able to be powered, in whole, or in part, by the stored thermal energy in the one or more thermal energy storage system 1403 by using an on-board steam generating system and/or one or more Stirling heat engines 1404.

Figure 15:
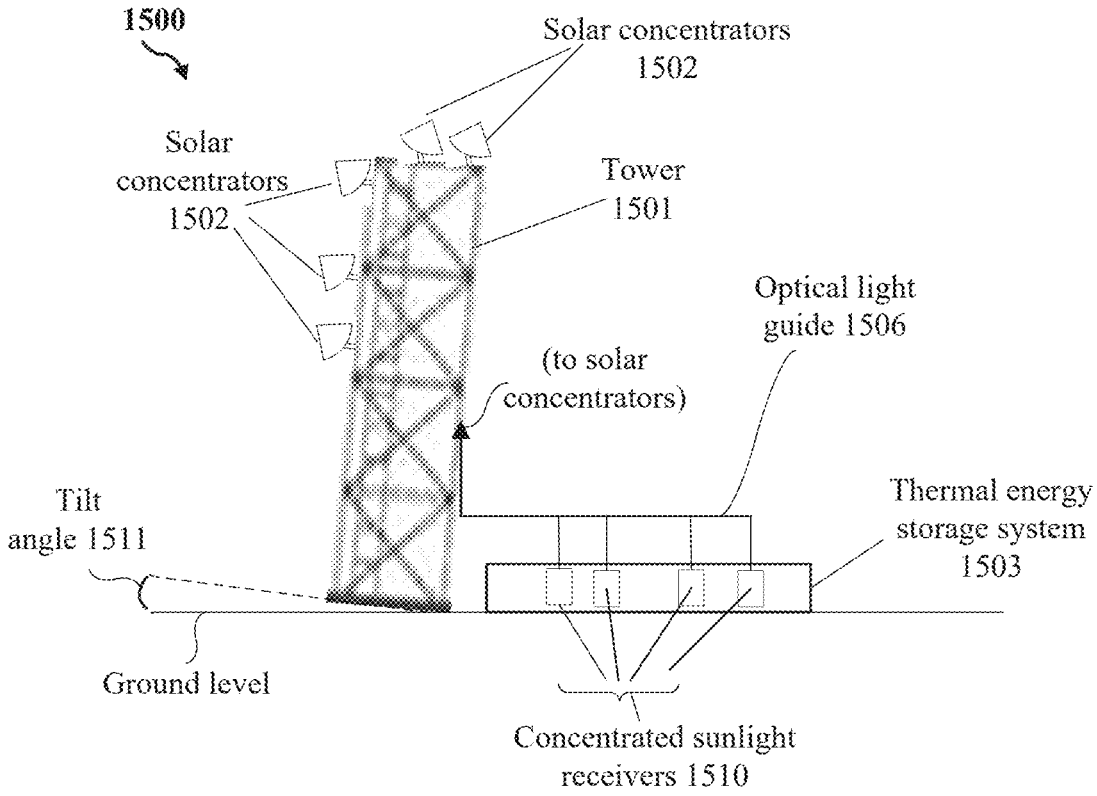
FIG. 15 shows a schematic diagram of solar energy harvesting and storage system, according to some implementations.

FIG. 15 shows a schematic diagram of solar energy harvesting and storage system 1500, according to some implementations. In some implementations, system 1500 may be used to minimize land use (or footprint) while maximizing thermal energy storage and power output using heat extraction means coupled to a power generation device as previously described herein. Wind turbine and photovoltaic solar arrays require huge swaths of land. As such, being spread out over a large area requires miles of expensive interconnecting power wiring and infrastructure to be acquired and installed in the ground. As described below with reference to FIG. 15, a tower or wall may be used to support one or more solar concentrators 1502. Concentrated sunlight may be directed to one or more thermal energy storage systems 1503 disposed on the ground. The one or more thermal energy storage systems 1503 may each include one or more concentrated sunlight receivers 1510.

In some implementations, solar energy harvesting and storage system 1500 may include a sunlight to thermal energy conversion system including one or more thermal energy storage systems 1503. Any one of the thermal energy storage systems previously described herein may be used as system 1503 for storing thermal energy produced from concentrated sunlight. Each thermal energy storage system 1503 may include one or more concentrated sunlight receivers 1510 disposed in thermal contact with thermal energy storage media (not shown for simplicity), a first chamber configured to house the one or more concentrated sunlight receivers and the thermal energy storage media, a second chamber substantially encapsulating the first chamber and separated from the first chamber by an insulation assembly and a light duct disposed between a thermal energy storage system inlet and an inlet associated with each of the respective one or more concentrated sunlight receivers 1510 (not shown for simplicity).

In some implementations, each of the one or more solar concentrators 1502 may be disposed on a support tower or wall 1501, wherein concentrated sunlight from each of the one or more solar concentrators is transferred to the thermal energy storage system using one or more optical light guides 1506. In some instances, system 1500 may further include a sun tracking system and a controller configured to optimize solar energy harvesting and storage by moving each of the one or more solar concentrators 1502 using the sun tracking system. Each of the one or more solar concentrators may be disposed on an azimuth-elevation (Az-El) mount coupled to the sun tracking system. In some instances, the one or more optical light guides may include one or more liquid light guides, each liquid light guide configured to transfer concentrated sunlight from the each of the respective plurality of solar concentrators 1502 to the thermal energy storage system 1503. In some instances, the one or more liquid light guides may include fluorinated ethylene propylene (FEP) polymer tubing filled with mineral oil. In some other instances, thermal energy storage system 1503 may be configured to prevent a liquid leaking from the liquid light guide from entering into one or more of the thermal energy storage system or into the one or more concentrated sunlight receivers, as previously described herein.

In some instances, the one or more optical light guides 1406 may include one or more fiber optic bundles, each bundle configured to transfer concentrated sunlight from each of the plurality of the respective solar concentrators 1502 to the thermal energy storage system 1503.

In some implementations, support tower 1501 may be tilted using a control system (not shown for simplicity) and/or suitable means relative to the ground at a tilt angle 1511. In some examples, the tilt angle 1511 may be approximately the same as the latitude coordinates associated with an installation site of the solar energy harvesting and storage system. As such, tower or wall 1501 may include one or more solar concentrators 1502 disposed on a sun facing side. Tower or wall 1501 may be tilted at an angle 1511 approximately the same as the latitude associated with the installation site. Accordingly, solar concentrators 1502 may be configured, using a suitable control system and/or sun tracking system as previously described herein, to track the sun and may enhance power generation per acre when coupled with a power generation device and suitable heat extraction means.

In some implementations, an example watercraft 1410 for harvesting solar energy offshore and generating electricity onshore may include any one of the offshore solar energy harvesting and storage system previously described herein, and a controller associated with the offshore solar energy harvesting and storage system. An example controller or control system may be configured to perform one or more operations including initiating the movement of the watercraft offshore to one or more predetermined latitude and longitude coordinates for harvesting solar energy and maintaining the watercraft's orientation to the sun (irrespective of wind or wave conditions, as previously described herein), optimizing solar energy harvesting and storage by moving each of the one or more solar concentrators using a sun tracking system, wherein each of the one or more solar concentrators is disposed on an azimuth-elevation (Az-El) mount coupled to the sun tracking system, determining whether an energy capacity associated with the thermal energy storage system meets or exceeds a predetermined energy capacity, initiating the movement of the watercraft to a port or shore and docking, and transferring thermal energy from the thermal energy storage system to an energy conversion device located onshore. In some instances, an engine 1404 associated with the watercraft 1401 may be configured to be powered in whole, or in part, using a predetermined amount of thermal energy stored in the thermal energy storage system 1403.

In some implementations, a method for harvesting solar energy offshore and generating electricity onshore may include disposing any of the offshore solar energy harvesting and storage systems previously described herein on a watercraft 1410 and using a controller associated with the offshore solar energy harvesting and storage system, performing one or more operations including:

(a) initiating the movement of the watercraft offshore to one or more predetermined latitude and longitude coordinates for harvesting solar energy and maintaining the watercraft's orientation to the sun, (b) optimizing solar energy harvesting and storage by moving each of the one or more solar concentrators using a sun tracking system, wherein each of the one or more solar concentrators is disposed on an azimuth-elevation (Az-El) mount coupled to the sun tracking system, (c) determining whether an energy capacity associated with the thermal energy storage system meets or exceeds a predetermined energy capacity, (d) initiating the movement of the watercraft to a port or shore and docking, and (e) transferring thermal energy from the thermal energy storage system to an energy conversion device located onshore.

In some instances, an example watercraft may include one or more of a ship, a barge, a boat, a vessel, a yacht, or a floatable platform that can be towed to shore or a port. In some other instances, the one or more operations as described above may further include powering an engine 1404 associated with the watercraft 1410, in whole, or in part, using a predetermined amount of thermal energy stored in the thermal energy storage system. In some instances, the engine 1404 may further include one or more of a steam turbine, a steam engine, or a Stirling heat engine.

EXAMPLES

Example 1. Predicted Absorption of Concentrated Sunlight Using Exemplary Thermal Energy Storage System An example thermal energy storage system included a concentrated sunlight receiver made of copper. The inner wall surfaces of the concentrated sunlight receiver may be oxidized. Oxidized copper is characterized by an emissivity of about 0.7. According to Kirchoff's law, if the concentrated sunlight receiver is approximated as a black body object, its absorptivity of sunlight is about 0.7 as absorptivity equals emissivity as equilibrium. Emissivity and absorptivity of 0.7 indicates that 30% of light will be reflected out by diffuse reflectance. As indicated in Table 1 shown below, about 97% of light may be absorbed by the example concentrated sunlight receiver after two reflections, for example as shown in FIG. 3E.

TABLE 1

| Estimation of absorption of sunlight. (Absorptivity = 0.7) | | |
|---|---|---|
| Number of reflections | Light absorbed | Light reflected |
| Light dispersed by light dispersing element and incident on the receiver wall inner surface | 0.7 | 0.3 |
| 1st reflection | $0.7 \times 0.3 = 0.21$ | $0.3 \times 0.3 = 0.09$ |
| $2^{nd}$ reflection | $0.7 \times 0.09 = 0.063$ | $0.3 \times 0.09 = 0.027$ |
| TOTAL | 0.973 | |

As can be clearly seen, increasing the absorptivity of the surface to a value greater than 70% would increase the amount of light absorbed. As previously described, the absorptivity of copper may be increasing by black anodizing the surface of the example copper concentrated sunlight receiver.

Example 2. Thermal Storage Capacity of Eutectoid Steel

Figure 13:
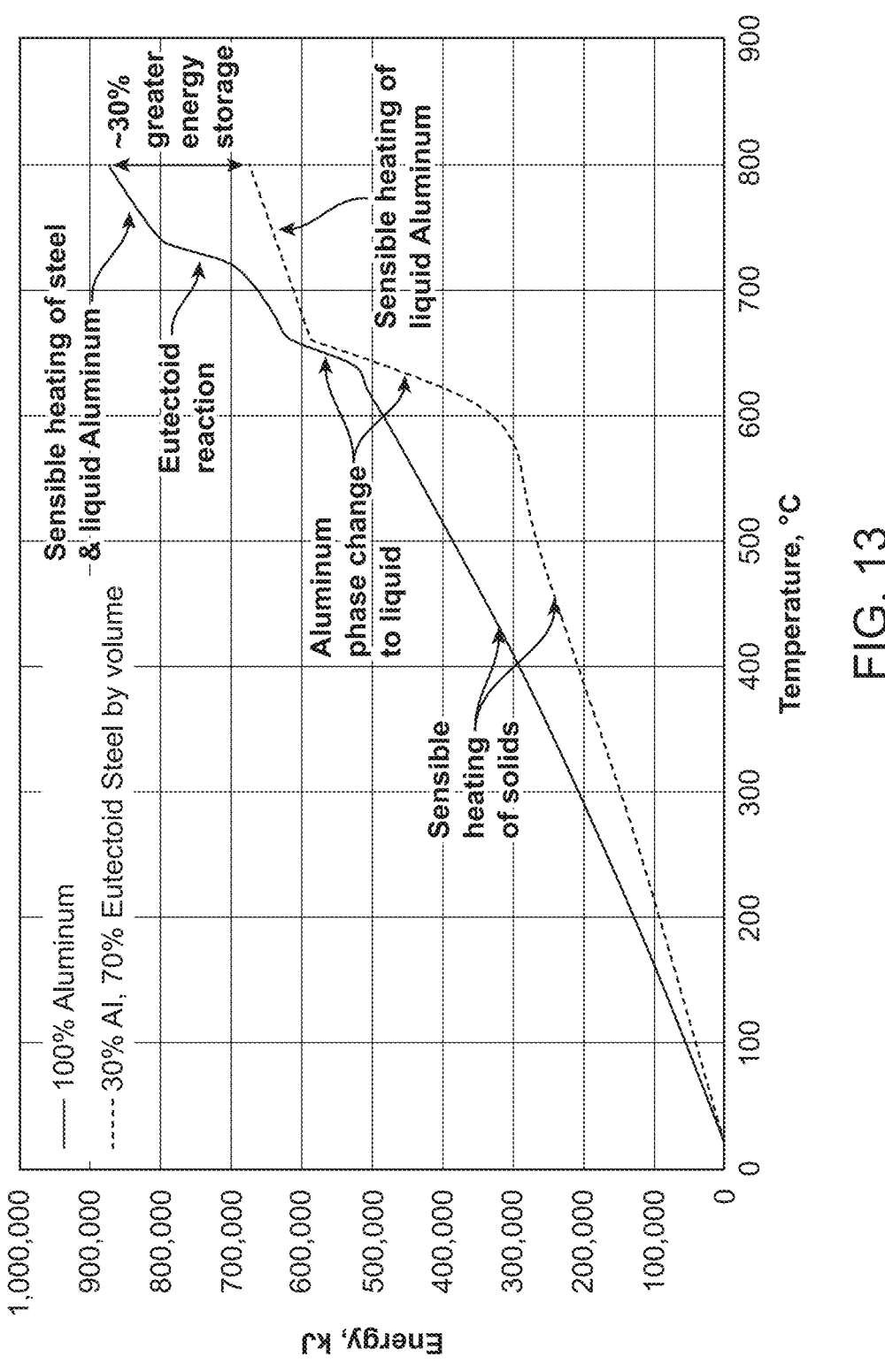
FIG. 13 shows a graph comparing the energy (kJ) storage capacity of thermal storage media including aluminum with that of 30 vol % aluminum-70% eutectoid steel composite, according to some implementations.

FIG. 13 shows a graph 1300 comparing the energy (KJ) storage capacity of thermal storage media including a 30 vol % aluminum, 70 vol % eutectoid steel ("30/70 composite"), according to some implementations. Eutectoid steel includes steel having about 0.8% carbon. The volume of the 30/70 composite thermal energy storage media was about 0.2 m³. In an example thermal energy storage system including the 30/70 composite as thermal energy storage media, the thermal energy storage media may include alternating layers of molten aluminum and eutectoid steel particles or pieces to achieve the 30/70 composite. The increase in stored energy from the latent heat of transformation related to aluminum melting can be clearly seen in FIG. 13. The step change in energy corresponding to the 30/70 composite is somewhat smaller than that corresponding to aluminum because the 30/70 composite only includes 30% aluminum by volume. The additional energy stored from the eutectoid reaction of the steel can be clearly seen in the 30/70 composite data. As can be seen, the overall thermal energy storage capacity of the 30/70 composite increased by about 30% in thermal storage capacity over aluminum alone. The working temperature range for these thermal storage media is between about 600° C. and about 800° C.

An example sunlight-to-thermal energy conversion system to produce about 100 kWh/day electric or 400 kWh/day thermal energy in Albuquerque, NM may include about 16 individual systems including primary parabolic dishes, about 2 meters in diameter each, and including about 1.3 m³ thermal storage media. Each thermal energy storage system may include the 30/70 composite as the thermal energy storage media. The time to achieve the initial thermal charge may be about 20 days if started in July and about 30 days if started in January.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. Unless otherwise specified in this disclosure, for construing the scope of the term "about" or "approximately," the error bounds associated with the values (dimensions, operating conditions etc.) disclosed is ±10% of the values indicated in this disclosure. The error bounds associated with the values disclosed as percentages is +1% of the percentages indicated. The word "substantially" used before a specific word includes the meanings "considerable in extent to that which is specified," and "largely but not wholly that which is specified."

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above in combination with one another, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

REFERENCES

1. Xu, X., Vignarooban, K., Xu, B., Hsu, K., Kannan, A. M., "Prospects and problems of concentrating solar power technologies," Renewable and Sustainable Energy Reviews, 53 (2016), 1106-1131.
2. Energy Storage Grand Challenge Roadmap, U.S. Department of Energy, U.S. DOE/PA-0022, December 2020.

What is claimed is:
1. An offshore solar energy harvesting and storage system disposed on a watercraft, the system including:
a sunlight to thermal energy conversion system including:
one or more thermal energy storage systems for storing thermal energy produced from concentrated sunlight, each thermal energy storage system including:

one or more concentrated sunlight receivers disposed in thermal contact with thermal energy storage media;
a first chamber configured to house the one or more concentrated sunlight receivers and the thermal energy storage media;
a second chamber substantially encapsulating the first chamber and separated from the first chamber by an insulation assembly; and
a light duct disposed between a respective thermal energy storage system inlet and an inlet associated with each of the respective one or more concentrated sunlight receivers; and
one or more solar concentrators disposed on a deck of the watercraft, wherein concentrated sunlight from each of the one or more solar concentrators is transferred to the one or more thermal energy storage systems using one or more optical light guides.
2. The offshore solar energy harvesting and storage system of claim 1, wherein each of the one or more thermal energy storage systems is disposed below the deck of the watercraft.
3. The offshore solar energy harvesting and storage system of claim 1, wherein the watercraft includes one or more of a ship, a barge, a boat, a vessel, a yacht, or a floatable platform that can be towed to shore or a port.
4. The offshore solar energy harvesting and storage system of claim 1, further including:
a sun tracking system; and
a controller configured to perform one or more of:
optimizing solar energy harvesting and storage by moving each of the one or more solar concentrators using the sun tracking system, wherein each of the one or more solar concentrators is disposed on an azimuth-elevation (Az-El) mount coupled to the sun tracking system, and
initiating the movement of the watercraft offshore to one or more predetermined latitude and longitude coordinates for harvesting solar energy and maintaining the orientation of the watercraft to the sun.
5. The offshore solar energy harvesting and storage system of claim 1, wherein each of the one or more solar concentrators includes one or more of Nasmyth-Coudé solar concentrators, parabolic dish solar concentrators, or Cassegrain solar concentrators.
6. The offshore solar energy harvesting and storage system of claim 1, wherein the one or more optical light guides include one or more liquid light guides, each liquid light guide configured to transfer concentrated sunlight from the each of the respective plurality of solar concentrators to a corresponding thermal energy storage system.
7. The offshore solar energy harvesting and storage system of claim 6, wherein the one or more liquid light guides include fluorinated ethylene propylene (FEP) polymer tubing filled with mineral oil.
8. The offshore solar energy harvesting and storage system of claim 6, wherein each of one or more thermal energy storage systems is configured to prevent a liquid leaking from its respective liquid light guide from entering into the thermal energy storage system.
9. The offshore solar energy harvesting and storage system of claim 1, the one or more optical light guides include one or more fiber optic bundles, each fiber optic bundle configured to transfer concentrated sunlight from each of the respective one or more solar concentrators to a corresponding thermal energy storage system.

10. The offshore solar energy harvesting and storage system of claim 1, wherein each of the one or more concentrated sunlight receivers includes a receiver wall inner surface and a receiver wall outer surface, wherein the receiver wall inner surface is characterized by a surface roughness Ra of at least 10 µm.

11. The offshore solar energy harvesting and storage system of claim 10, wherein the receiver wall inner surface includes a plurality of inner surface grooves extending into the receiver wall.

12. The offshore solar energy harvesting and storage system of claim 1, wherein each of the one or more concentrated sunlight receivers includes a receiver wall inner surface and a receiver wall outer surface, wherein the receiver wall inner surface is black anodized or painted black.

13. The offshore solar energy harvesting and storage system of claim 1, wherein each of the one or more concentrated sunlight receivers is in the shape of a lava lamp characterized by first truncated conical section and second truncated conical section joined at a common base.

14. The offshore solar energy harvesting and storage system of claim 1, wherein each of the one or more concentrated sunlight receivers is cylindrical, spherical, or conical in shape.

15. The offshore solar energy harvesting and storage system of claim 1, wherein the thermal energy storage system further includes a light duct shutter, wherein the shutter includes a sapphire window disposed adjacent to and spaced apart from a reflective plate.

16. The offshore solar energy harvesting and storage system of claim 1, wherein each of the one or more concentrated sunlight receivers further includes a light dispersing element disposed opposite to an inlet of each of the respective concentrated sunlight receivers and configured to disperse concentrated sunlight towards one or more walls of each of the respective concentrated sunlight receivers.

17. The offshore solar energy harvesting and storage system of claim 16, wherein the light dispersing element is characterized by a reflectivity of at least 0.80.

18. The offshore solar energy harvesting and storage system of claim 16, wherein the light dispersing element is conical in shape.

19. The offshore solar energy harvesting and storage system of claim 1, wherein each of the one or more concentrated sunlight receivers further includes fins extending into the thermal energy storage media.

20. The offshore solar energy harvesting and storage system of claim 1, wherein the insulation assembly includes one or more of:

an insulation material disposed between the first chamber and the second chamber;

a reflective liner; and an evacuated space disposed between the first chamber and the second chamber.

21. The offshore solar energy harvesting and storage system of claim 1, wherein the thermal energy storage media includes one or more of:

aluminum;

carbon steel dispersed in aluminum;

eutectoid steel dispersed in aluminum;

interleaved copper and carbon steel plates, wherein the copper plates are in thermal contact with the concentrated sunlight receiver;

interleaved copper and eutectoid steel plates, wherein the copper plates are in thermal contact with the concentrated sunlight receiver;

heat transfer fluid capable of heat storage of up to 350° C.; or carbon steel immersed in high temperature heat transfer fluid capable of heat storage of up to 350° C.

22. The offshore solar energy harvesting and storage system of claim 21, wherein the eutectoid steel includes carbon steel having about 0.8% carbon.

23. The offshore solar energy harvesting and storage system of claim 1, further including heat extraction means disposed in thermal communication with the thermal energy storage media.

24. The offshore solar energy harvesting and storage system of claim 23, wherein the heat extraction means includes one or more of a heat transfer piping disposed in contact with the first chamber and between the first chamber and the second chamber, or disposed within the first chamber, wherein a heat transfer fluid is passed thorough the piping to remove heat from the thermal storage media to an energy conversion device located onshore.

25. The offshore solar energy harvesting and storage system of claim 23, wherein the heat extraction means includes circulating heat transfer fluid through the first chamber, and wherein the heat transfer fluid removes heat from the thermal storage media to an energy conversion device located onshore.

26. The offshore solar energy harvesting and storage system of claim 23, wherein the heat extraction means includes one or more of a heat pipe or thermosyphon system, wherein heat is transferred from the thermal energy storage media to an energy conversion device located onshore.

27. A method for harvesting solar energy offshore and generating electricity onshore, the method including:

disposing the offshore solar energy harvesting and storage system of claim 1 on a watercraft; and using a controller associated with the offshore solar energy harvesting and storage system, performing one or more operations including:

initiating the movement of the watercraft offshore to one or more predetermined latitude and longitude coordinates for harvesting solar energy and maintaining the watercraft's orientation to the sun;

optimizing solar energy harvesting and storage by moving each of the one or more solar concentrators using a sun tracking system, wherein each of the one or more solar concentrators is disposed on an azimuth-elevation (Az-El) mount coupled to the sun tracking system;

determining whether an energy capacity associated with the thermal energy storage system meets or exceeds a predetermined energy capacity;

initiating the movement of the watercraft to a port or shore and docking; and transferring thermal energy from the thermal energy storage system to an energy conversion device located onshore.

28. The method of claim 27, wherein the watercraft includes one or more of a ship, a barge, a boat, a vessel, a yacht, or a floatable platform that can be towed to shore or a port.

29. The method of claim 27, wherein the one or more operations further includes powering an engine associated with the watercraft, in whole, or in part, using a predetermined amount of thermal energy stored in the thermal energy storage system.

30. The method of claim 29, wherein the engine includes one or more of a steam turbine, a steam engine, or a Stirling heat engine.

31. A watercraft for harvesting solar energy offshore and generating electricity onshore, the watercraft including:

the offshore solar energy harvesting and storage system of claim 1; and a controller associated with the offshore solar energy harvesting and storage system, configured to perform one or more operations including:

initiating the movement of the watercraft offshore to one or more predetermined latitude and longitude coordinates for harvesting solar energy and maintaining the watercraft's orientation to the sun;

optimizing solar energy harvesting and storage by moving each of the one or more solar concentrators using a sun tracking system, wherein each of the one or more solar concentrators is disposed on an azimuth-elevation (Az-El) mount coupled to the sun tracking system;

determining whether an energy capacity associated with the thermal energy storage system meets or exceeds a predetermined energy capacity;

initiating the movement of the watercraft to a port or shore and docking; and transferring thermal energy from the thermal energy storage system to an energy conversion device located onshore.

32. The watercraft of claim 31, wherein an engine associated with the watercraft is configured to be powered in whole, or in part, using a predetermined amount of thermal energy stored in the thermal energy storage system.

33. A solar energy harvesting and storage system including:

a sunlight to thermal energy conversion system including:

a thermal energy storage system for storing thermal energy produced from concentrated sunlight, the thermal energy storage system including:

one or more concentrated sunlight receivers disposed in thermal contact with thermal energy storage media;

a first chamber configured to house the one or more concentrated sunlight receivers and the thermal energy storage media;

a second chamber substantially encapsulating the first chamber and separated from the first chamber by an insulation assembly; and a light duct disposed between a thermal energy storage system inlet and an inlet associated with each of the respective one or more concentrated sunlight receivers; and one or more solar concentrators disposed on a support tower or wall, wherein concentrated sunlight from each of the one or more solar concentrators is transferred to the thermal energy storage system using one or more optical light guides.

34. The solar energy harvesting and storage system of claim 33, further including:

a sun tracking system; and a controller configured to optimize solar energy harvesting and storage by moving each of the one or more solar concentrators using the sun tracking system, wherein each of the one or more solar concentrators is disposed on an azimuth-elevation (Az-El) mount coupled to the sun tracking system.

35. The solar energy harvesting and storage system of claim 33, wherein the one or more optical light guides include one or more liquid light guides, each liquid light guide configured to transfer concentrated sunlight from the each of the one or more solar concentrators to the thermal energy storage system.

36. The solar energy harvesting and storage system of claim 35, wherein the one or more liquid light guides include fluorinated ethylene propylene (FEP) polymer tubing filled with mineral oil.

37. The solar energy harvesting and storage system of claim 33, wherein the thermal energy storage system is configured to prevent a liquid leaking from the liquid light guide from entering into one or more of the thermal energy storage system or into the one or more concentrated sunlight receivers.

38. The solar energy harvesting and storage system of claim 33, the one or more optical light guides include one or more fiber optic bundles, each bundle configured to transfer concentrated sunlight from each of the plurality of the respective solar concentrators to the thermal energy storage system.

39. The solar energy harvesting and storage system of claim 33, wherein the support tower is tilted relative to the ground at a tilt angle.

40. The solar energy harvesting and storage system of claim 39, wherein the tilt angle is approximately the same as the latitude coordinates associated with an installation site of the solar energy harvesting and storage system.

* * * * *